(12) United States Patent
House et al.

(10) Patent No.: US 11,562,254 B2
(45) Date of Patent: Jan. 24, 2023

(54) DISTRIBUTION OF NEURAL NETWORKS WITH BLOCKCHAINS

(71) Applicant: McAfee, LLC, Santa Clara, CA (US)

(72) Inventors: Amanda House, Frisco, TX (US);
Celeste R. Fralick, Lubbock, TX (US);
Eric Wuehler, Hillsboro, OR (US);
Sherin Mathews, Fremont, CA (US)

(73) Assignee: McAfee, LLC, San Jose, CA (US)

( * ) Notice: Subject to any disclaimer, the term of this patent is extended or adjusted under 35 U.S.C. 154(b) by 780 days.

(21) Appl. No.: 16/526,743

(22) Filed: Jul. 30, 2019

(65) Prior Publication Data

US 2021/0034986 A1    Feb. 4, 2021

(51) Int. Cl.
| | |
|---|---|
| *G06F 16/00* | (2019.01) |
| *G06N 3/10* | (2006.01) |
| *G06F 16/27* | (2019.01) |
| *G06N 3/04* | (2006.01) |
| *G06N 3/08* | (2006.01) |
| *H04L 67/10* | (2022.01) |

(52) U.S. Cl.
CPC ............. *G06N 3/10* (2013.01); *G06F 16/27* (2019.01); *G06N 3/04* (2013.01); *G06N 3/08* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 6,125,388 | A | * | 9/2000 | Reisman ............... G06Q 40/123 709/200 |
| 9,760,827 | B1 | * | 9/2017 | Lin ........................... G06N 3/08 |
| 10,594,034 | B1 | * | 3/2020 | Tran ........................ H04W 4/40 |

(Continued)

FOREIGN PATENT DOCUMENTS

WO    2019100084    5/2019

OTHER PUBLICATIONS

"Blockchain to Aid Artificial Intelligence for Overcoming Deep Learning Drawbacks," CIOReview, Jan. 28, 2019, 3 pages. Retrieved from https://www.cioreview.com/news/blockchain-to-aid-artificial-intelligence-for-overcoming-deep-learning-drawbacks-nid-27893-cid-176.html.

(Continued)

*Primary Examiner* — Farhan M Syed
(74) *Attorney, Agent, or Firm* — Hanley, Flight & Zimmerman, LLC

(57) ABSTRACT

Example apparatus disclosed herein generate blocks of a blockchain, the blockchain to store a neural network that has input nodes, hidden nodes and output nodes, with respective ones of the blocks of the blockchain including respective code and respective data to represent corresponding ones of the output nodes of the neural network, a first one of the blocks including first code and first data to implement operations to be performed by a first one of the output nodes, the hidden nodes and the input nodes on input data applied to the neural network to determine an output of the first one of the output nodes. Disclosed example apparatus also train the neural network to determine at least portions of the respective data to include in the respective ones of the blocks of the blockchain, and forward the blockchain to a server that is to distribute the neural network to client(s).

20 Claims, 13 Drawing Sheets

(56) References Cited

U.S. PATENT DOCUMENTS

| | | | |
|---|---|---|---|
| 10,811,771 B1* | 10/2020 | Tran | H04W 4/44 |
| 10,873,456 B1* | 12/2020 | Dods | G06N 20/00 |
| 10,916,845 B2* | 2/2021 | Tran | H01Q 1/04 |
| 10,945,166 B2* | 3/2021 | Crawford | H04L 67/146 |
| 10,963,786 B1* | 3/2021 | Taylor | G06N 3/084 |
| 2017/0232300 A1* | 8/2017 | Tran | A63B 71/06 |
| | | | 434/247 |
| 2019/0012595 A1* | 1/2019 | Beser | G06Q 20/36 |
| 2019/0172073 A1* | 6/2019 | Wiig | H04L 9/0852 |
| 2019/0349426 A1* | 11/2019 | Smith | H04L 45/20 |
| 2019/0349733 A1* | 11/2019 | Nolan | H04L 9/0825 |
| 2019/0373521 A1* | 12/2019 | Crawford | H04L 67/104 |
| 2019/0394242 A1* | 12/2019 | Wig | H04L 9/3239 |
| 2020/0294128 A1* | 9/2020 | Celia | G06Q 20/405 |
| 2020/0311553 A1* | 10/2020 | Keski-Valkama | G06N 3/04 |
| 2020/0311757 A1* | 10/2020 | Keski-Valkama | G06N 3/08 |
| 2020/0358183 A1* | 11/2020 | Tran | H04W 4/40 |
| 2020/0358184 A1* | 11/2020 | Tran | H04W 4/027 |
| 2020/0388359 A1* | 12/2020 | Bhandari | H04L 67/306 |
| 2021/0126826 A1* | 4/2021 | Nolan | H04L 41/12 |
| 2021/0151884 A1* | 5/2021 | Tran | G06N 3/0454 |
| 2021/0192346 A1* | 6/2021 | Taylor | G06N 20/00 |

OTHER PUBLICATIONS

Wang et al., "Building Adversary-Resistant Deep Neural Networks without Security through Obscurity," Aug. 19, 2017, 12 pages.

Wolfram, "Did Stephen Wolfram's Knowledge Engine Just Become a Quantum Neural Blockchain AI?" Scientific American, Apr. 1, 2018, 26 pages. Retrieved from https://blogs.scientificamerican.com/observations/did-stephen-wolframs-knowledge-engine-just-become-a-quantum-neural-blockchain-ai/.

International Searching Authority, "International Search Report and Written Opinion," mailed in connection with International Patent Application No. PCT/US2020/043308, dated Nov. 6, 2020, 14 pages.

International Searching Authority, "International Preliminary Report on Patentability," mailed in connection with International Patent Application No. PCT/US2020/043308, dated Feb. 1, 2022, 8 pages.

* cited by examiner

DISTRIBUTION OF NEURAL NETWORKS WITH BLOCKCHAINS

FIELD OF THE DISCLOSURE

This disclosure relates generally to neural networks and, more particularly, to distribution of neural networks with blockchains.

BACKGROUND

Artificial intelligence is becoming an important component of leading-edge computer security products. For example, neural networks and other machine learning algorithms allow such computer security products to detect zero-day threats that exploit unknown computer security vulnerabilities, which may be undetectable by at least some prior threat detection solutions. However, machine learning algorithms, such as neural networks, can be vulnerable to adversarial attacks intended to poison and/or evade the neural network, such as through gaining access to the neural network to tamper with the neural network's model parameters, apply doctored data to the neural network to reduce the neural network's detection accuracy, etc.

Figure 1:
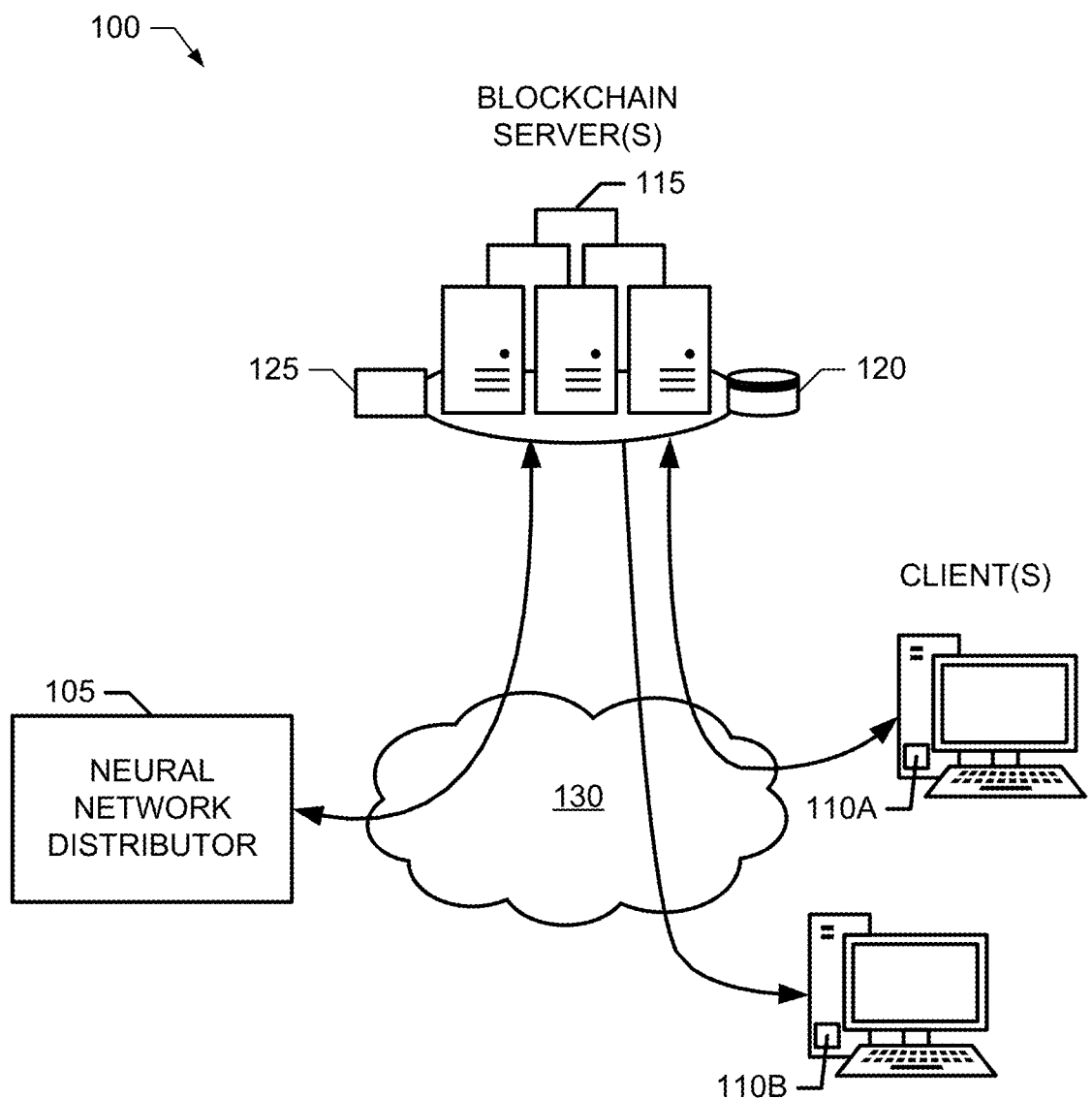
FIG. 1 is a block diagram of an example environment in which an example neural network distributor is to distribute a neural network to one or more example clients using one or more example blockchain servers in accordance with teachings of this disclosure.

The figures are not to scale. In general, the same reference numbers will be used throughout the drawing(s) and accompanying written description to refer to the same or like parts, elements, etc. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example methods, apparatus, systems and articles of manufacture (e.g., physical storage media) to distribute neural networks with blockchains are disclosed herein. Example neural network distribution apparatus disclosed herein to distribute a neural network include an example blockchain generator to generate blocks of a blockchain that is to store the neural network. For example, the neural network may include input nodes, hidden nodes and output nodes. In some such examples, the blockchain generator is to generate respective ones of the blocks of the blockchain to include respective code and respective data to represent corresponding ones of the output nodes of the neural network. For example, a first one of the blocks may include first code and first data to implement operations to be performed by a first one of the output nodes, the hidden nodes and the input nodes on input data applied to the neural network to determine an output of the first one of the output nodes. Disclosed example apparatus also include an example neural network training engine to train the neural network based on training data to determine at least portions of the respective data to include in the respective ones of the blocks of the blockchain. Disclosed example apparatus further include an example publisher to forward (e.g., transmit) the blockchain to a server that is to distribute the neural network to one or more clients.

In some disclosed examples, the first code is to define respective functions to be performed by the first one of the output nodes, the hidden nodes and the input nodes along a path from the input nodes to the first one of the output nodes in the neural network. For example, the blockchain generator may generate the first code to represent the respective functions to be performed by the first one of the output nodes, the hidden nodes and the input nodes in a Merkle tree structure. In some such disclosed examples, the first data is to include trained values of model parameters corresponding to the respective functions to be performed by the first one of the output nodes, the hidden nodes and the input nodes.

Additionally or alternatively, in some disclosed examples, the blocks of the blockchain are a first group of blocks of the blockchain corresponding to a first training iteration performed by the neural network training engine, and the blockchain generator is to generate an updated second group of blocks to add to the blockchain after a second training iteration performed by the neural network training engine to train the neural network. In some such disclosed examples, the blockchain generator is to add the second group of blocks to the blockchain storing the neural network. In some such disclosed examples, the publisher is to transmit the blockchain to the server after the neural network training engine has trained the neural network such that the blockchain is to include respective groups of blocks corresponding to respective training iterations performed by the neural network training engine, with the respective groups of blocks including the first group of blocks corresponding to the first training iteration and the second group of blocks corresponding to the second training iteration.

In some such disclosed examples, the neural network distribution apparatus also includes an example blockchain updater to add a third group of blocks received from a first one of the clients to the blockchain. For example, the third group of blocks may correspond to an update to the neural network to be made by the first one of the clients. Additionally or alternatively, in some such disclosed examples, the publisher is to include respective version information in the respective groups of blocks included in the blockchain to identify versions of the neural network corresponding to the respective groups of blocks included in the blockchain These and other example methods, apparatus, systems and articles of manufacture (e.g., physical storage media) to distribute of neural networks with blockchains are disclosed in further detail below.

As mentioned above, known computer security products may include neural networks to enable detection of zero-day threats that may be undetectable by at least some prior threat detection solutions. However, the neural networks can be vulnerable to adversarial attacks intended to poison and/or evade the neural network. As such, without adequate protection, the threat detection accuracy of the neural networks employed by known computer security products may be diminished.

Example neural network distribution solutions disclosed herein utilize blockchain technology to distribute neural networks to computer security clients, such as anti-virus detection clients, malware detection clients, firewall clients, etc., in a secure and traceable manner. Prior blockchain implementations focus on storing transaction information, such as the blockchain used to implement Bitcoin's decentralized ledger. In contrast, example neural network distribution solutions disclosed herein utilize a blockchain to store the mathematical functions that implement the neural network (e.g., including the mathematical equations defining those functions and the parameter values of those equations), as well as the corresponding input data and output data applied to and produced by those functions, respectively, as the neural network is trained prior to distribution and/or re-trained after distribution. For example, a neural network includes nodes arranged in a hierarchical network, such as input nodes connected to hidden nodes, which are in turn connected to output nodes. The neural network accepts input data and creates one or more resulting outputs based on mathematical functions implemented by each of the nodes of the neural network. In some such examples, the mathematical functions of the neural network that operate on the input data to produce an output corresponding to a given one of the output nodes of the neural network are represented by a Merkle tree data structure stored in a block of the blockchain.

Thus, in some disclosed examples, each block of the blockchain used to distribute a neural network (1) corresponds to a respective output node of the neural network and (2) stores information (e.g., the Merkle tree data structure) defining one or more of the mathematical functions of the neural network that operate on the input data to produce the output corresponding to that output node. In some such examples, each block of the blockchain also stores the corresponding input data and output data applied to and produced by each of the one or more mathematical functions along the path from the input nodes to the given output node represented by that block. As such, example blockchain solutions disclosed herein provide a secure structure that can be used to store the mathematical functions implementing the nodes of the neural network, the evolution of the parameters of those functions as the neural network is trained before distribution and/or re-trained after distribution, a history of input data and corresponding output results during training and/or subsequent operation, etc. Through such a secure structure, the integrity of the neural network can be ensured as any attempts to change the blockchain used to distribute the neural network would be readily detectable. Furthermore, some disclosed examples utilize a proof-of-authority blockchain to restrict the ability to update the blockchain to trusted entities (e.g., associated with authorized and authenticated accounts, clients, etc.). Such proof-of authority can prevent or at least mitigate malicious tampering of the neural network by an adversary.

Furthermore, example blockchain solutions disclosed herein to distribute neural networks may help solve the problem of unexplainable artificial intelligence. Neural networks have grown increasingly complex such that is has become difficult to explain how a neural network determines its outputs based on a given set of input data. Such an inability to explain the underlying behavior of a neural network (also referred to as unexplainable artificial intelligence) can be problematic on many fronts, such as in the context of debugging errors in neural network decisions (e.g., such as in the context of correcting mistakes made by a neural network when detecting malware threats, controlling an autonomous vehicle, etc.), in the context of identifying how user data is being used by the neural network to meet government regulation concerning bias, data privacy, etc. By storing the mathematical functions implementing the nodes of the neural network, the evolution of the parameters of those functions as the neural network is trained and/or re-trained, and a history of input data and corresponding output results during training and/or subsequent operation, disclosed example blockchain solution enable distributors, developers, researchers, regulators, etc., to trace a particular neural network result back to the particular input data and/or evolution of the neural network that yielded that result.

Turning to the figures, an example environment of use 100 in which an example neural network distributor 105 implemented in accordance with teachings of this disclosure is to distribute a neural network to one or more example clients 110A-B using one or more example blockchain servers 115 is illustrated in FIG. 1. For example, the neural network distributed by the neural network distributor 105 may be included in a computer security product (e.g., such as an anti-virus detection product, a malware detection product, a firewall product, etc.), a control application (e.g., to control autonomous vehicles, robotics, etc.), a measurement/analysis application (e.g., a flight control application, a financial planning too, etc.), etc., for execution by the example clients 110A-B. As such, the example clients 110A-B can correspond to any computing device (e.g., a smartphone, a tablet computer, a notebook computer, a desktop computer, a smart appliance, etc.), server, data center, cloud service, etc. For example, the example clients 110A-B of FIG. 1 can each be implemented by a processor platform such as the example processor platform 1200 of FIG. 12, which is described in further detail below.

In the illustrated example of FIG. 1, the neural network distributor 105 generates a blockchain to store the neural network to be distributed to the clients 110A-B. As disclosed in further detail below, the blockchain blocks generated by the neural network distributor 105 correspond respectively to the output nodes of the neural network. For example, the neural network distributor 105 generates programming code and data to include in a respective one of the blocks of the blockchain that can be used (e.g., executed) to determine an output of the respective neural network output node represented by that corresponding block of the blockchain. The programming code and data included in the blockchain block for a given output node is generated based on the mathematical operations to be performed by the input nodes, the hidden nodes and the given output node of the neural network on input data applied to the neural network to determine the output of the given output node of the neural network. In other words, each block of the blockchain corresponds to a respective output block of the neural network, and includes respective programming code and data representing the processing performed by the input nodes, the hidden nodes and that corresponding output node of the neural network.

After generating the blocks of the blockchain storing the neural network, the example neural network distributor 105 of FIG. 1 publishes the blocks of the blockchain to the one or more example blockchain servers 115 that implement the blockchain. The blockchain server(s) 115 of the illustrated example may be implemented by any types and/or number of computing devices, servers, data centers, cloud services, etc. For example, the neural network distributor 105 of FIG. 1 can be implemented by the example processor platform 1300 of FIG. 13, which is described in further detail below. The blockchain server(s) 115 can implement a public blockchain, a private blockchain, or any number or combination thereof. A blockchain is a computing architecture in which information (e.g., the program code and data representing a given output node of the neural network) is grouped into blocks that are added one after the other to the blockchain. Each block of the blockchain contains information to verify that it follows from the preceding block in the blockchain. This feature of adding blocks one after the other to the blockchain and including information in the blocks to verify their positions in the blockchain enable the blockchain to securely store and track the information maintained in the blockchain.

In some examples, the blockchain server(s) 115 include a centralized blockchain server (possibly with one or more backup servers) to implement a centralized blockchain mechanism for accessing the blockchain storing the neural network to be distributed to the clients 110A-B. In some examples, the blockchain server(s) 115 include multiple distributed blockchain servers to implement a distributed blockchain mechanism for accessing the blockchain storing the neural network to be distributed to the clients 110A-B. In either example, a given blockchain server 115 can include example blockchain storage 120 to store the blocks of the blockchain, and an example blockchain request handler 125 to handle requests by the neural network distributor 105 to publish the blockchain (e.g., to store an initial group of blockchain blocks representing an initial version of the neural network), requests by the neural network distributor 105 to update the contents of the blockchain (e.g., to add a new group of blocks to the blockchain to update the neural network), requests by the clients 110A-B to access (e.g., download) the contents of a group of blocks of the blockchain representing a given version of the neural network, request by the clients 110A-B to update the contents of the blockchain (e.g., to add a new group of blocks to the blockchain to retrain the neural network), etc.

In the illustrated example of FIG. 1, the neural network distributor 105 also implements proof-of-authority to restrict access to the blockchain storing the neural network. For example, the neural network distributor 105 may allow unrestricted access for the clients 110A-B to download the contents of the blockchain (e.g., to download a given version of the neural network), but may implement one or more authentication procedures to restrict the ability to update the blockchain to trusted entities. Trusted entities can correspond to authorized and authenticated accounts, authorized and authenticated ones of the clients 110A-B, etc. In some examples, when the blockchain request handler 125 of a blockchain server 115 receives a request from an entity to update the blockchain, the blockchain request handler 125 contacts the neural network distributor 105, which invokes an authentication procedure to verify that the requestor is authorized to update the blockchain. For example, when the blockchain request handler 125 of the blockchain server 115 receives a request from one of the clients 110A-B requesting to provide a new group of blocks corresponding to a retraining of the neural network, the blockchain request handler 125 contacts the neural network distributor 105, which invokes an authentication procedure to verify that the requesting client 110A-B is authorized to update the blockchain. If the requesting client 110A-B is authorized to update the blockchain, the blockchain server 115 grants the requesting client 110A-B access to add the new group of blocks to the blockchain. However, if the requesting client 110A-B is not authorized to update the blockchain, the blockchain server 115 denies the requesting client 110A-B access to update the blockchain. As shown in the illustrated example of FIG. 1, the client 110A is authorized to update the blockchain storing the neural network, whereas the client 110B is permitted to download contents of the blockchain, but is not authorized to update the blockchain.

Figure 4:
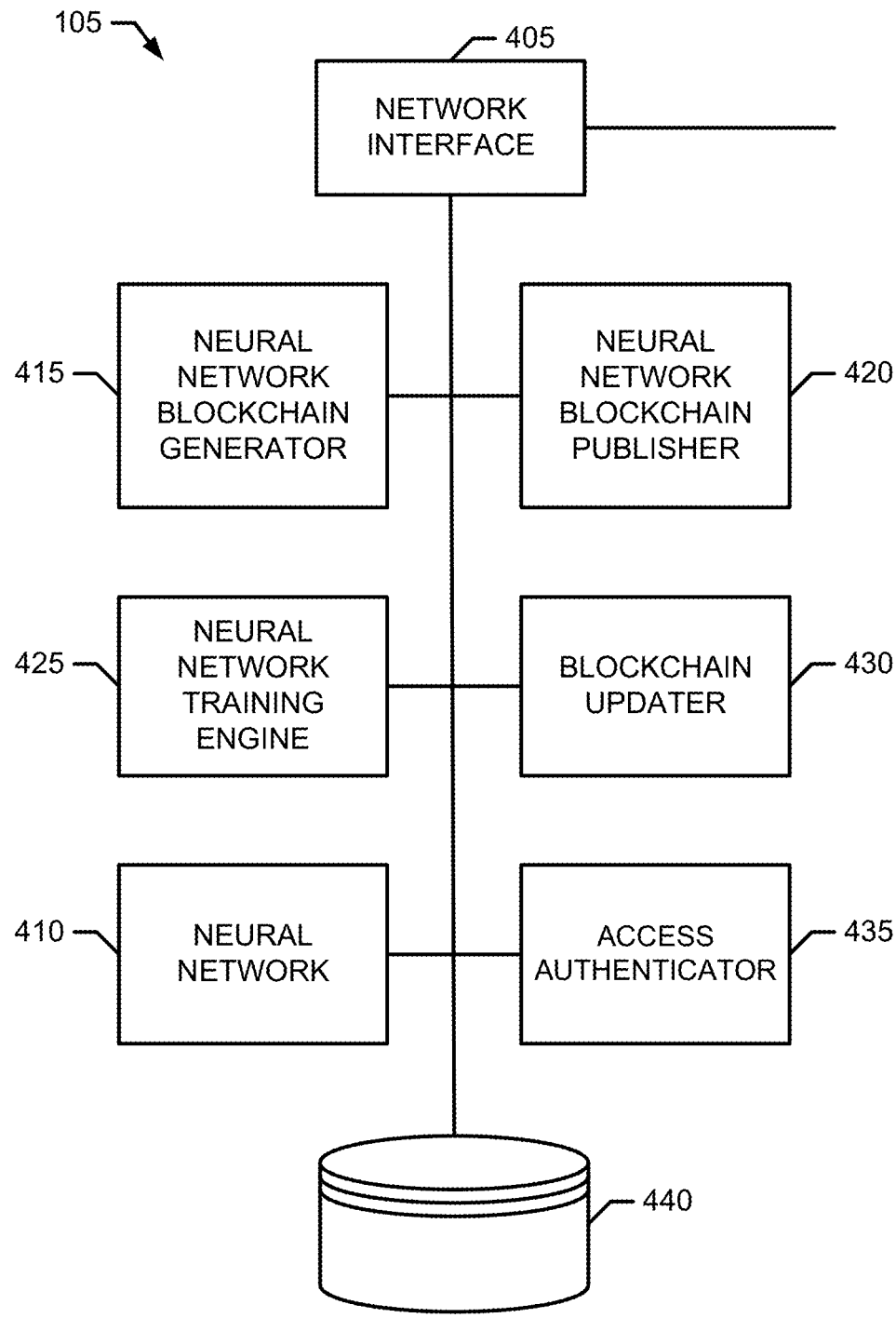
FIG. 4 is a block diagram of an example implementation of the neural network distributor of FIG. 1.

In the illustrated example of FIG. 1, the neural network distributor 105 can be implemented by any suitably configured, adapted or otherwise structured computing device (e.g., a smartphone, a tablet computer, a notebook computer, a desktop computer, a smart appliance, etc.), server, data center, cloud service, etc. For example, the neural network distributor 105 of FIG. 1 can be implemented by the example processor platform 1100 of FIG. 11, which is described in further detail below. A more detailed example implementation of the neural network distributor 105 of FIG. 1 is illustrated in FIG. 4, which is described below.

In the illustrated example of FIG. 1, the neural network distributor 105, the clients 110A-B and the blockchain server(s) 115 communicate via an example communication network 130. The communication network 130 of the illustrated example can be implemented by any number and/or types of communication networks. For example, the communication network 130 can be implemented by one or more wired/cabled networks, one or more wireless networks (e.g., mobile cellular networks, satellite networks, etc.), one or more proprietary networks, one or more public networks (e.g., such as the Internet), etc., or any combination thereof.

Although the example environment 100 of FIG. 1 is illustrated as including one example neural network distributor 105, two example clients 110A-B, one example blockchain server 115 and one example communication network 130, blockchain-based neural network distribution solutions implemented in accordance with teachings of this disclosure are not limited thereto. On the contrary, example blockchain-based neural network distribution solutions implemented in accordance with teachings of this disclosure can include any number of example neural network distributors 105, example clients 110A-B, example blockchain servers 115, example communication networks 130, etc. Further, although the disclosure focuses on distribution of neural networks using blockchain, other machine learning algorithms that can be decomposed into functions defining input to output data relationships can be distributed in accordance with teachings of this disclosure.

Figure 2:
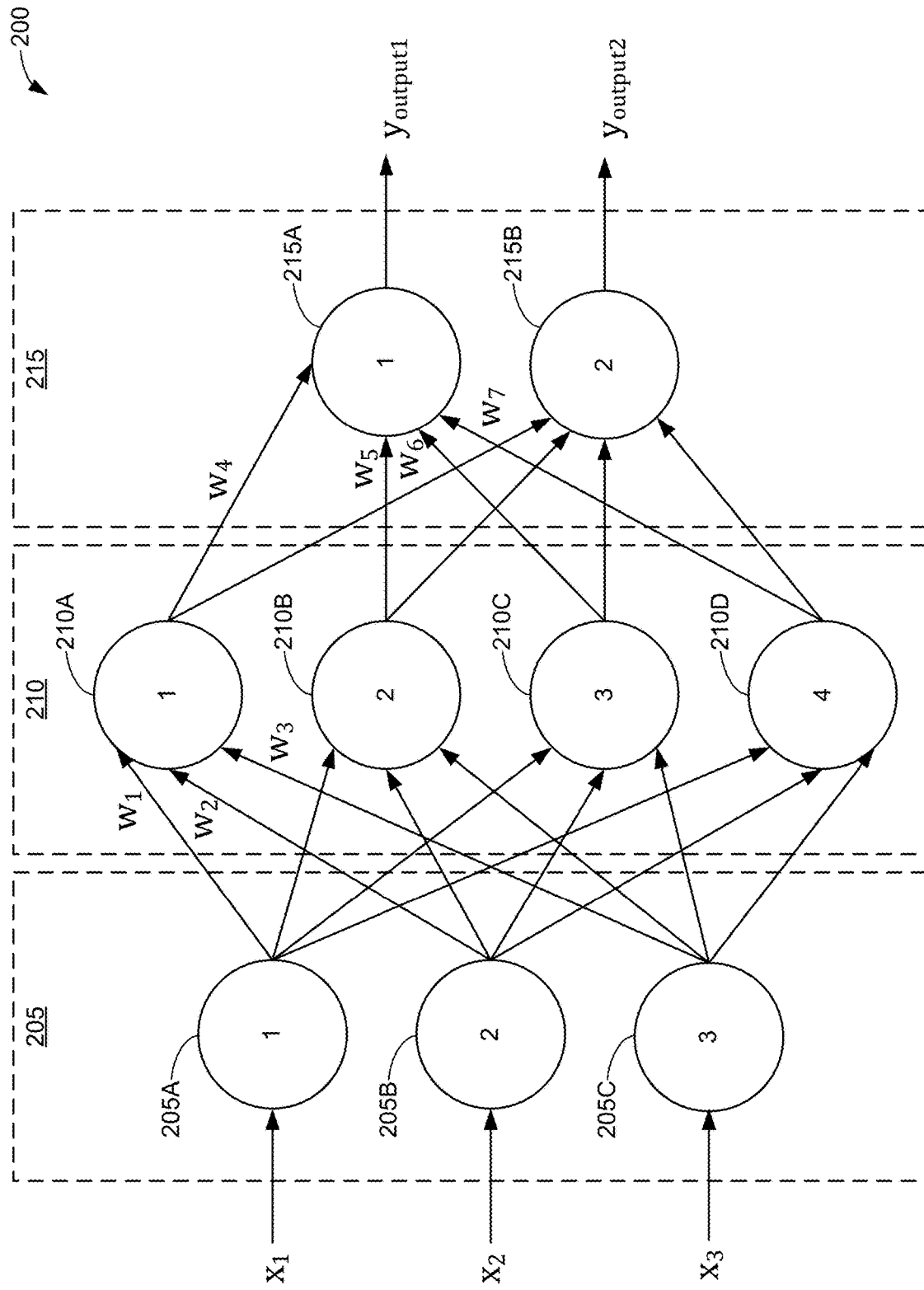
FIGS. 2-3 illustrate an example neural network to be distributed by the example neural network distributor of FIG. 1.
Figure 3:
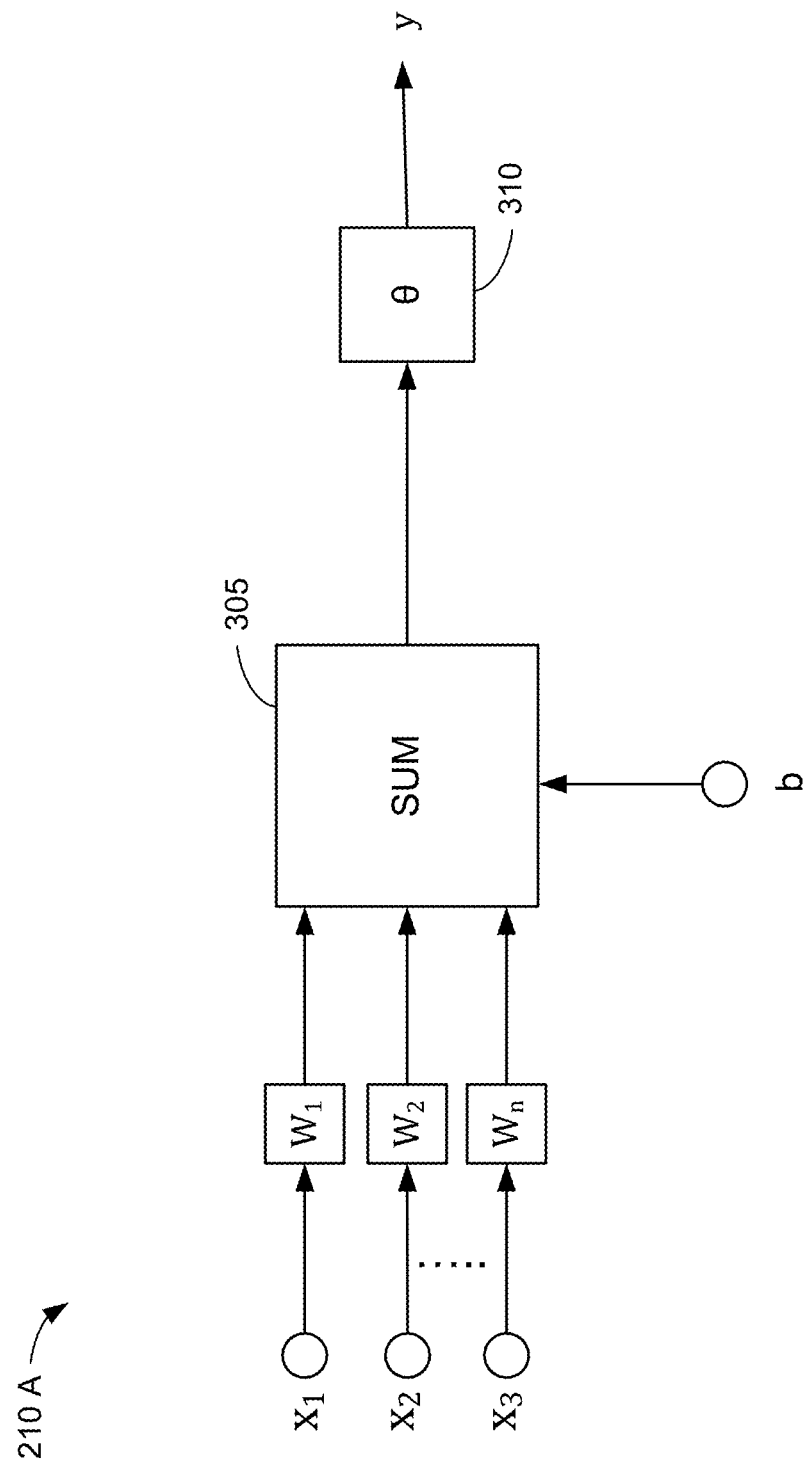

An example neural network 200 to be distributed by the example neural network distributor 105 of FIG. 1 is illustrated in FIGS. 2-3. With reference to FIG. 2, the example neural network 200 illustrated therein includes example input nodes 205A-C corresponding to an example input layer (represented collectively by the label 205), example hidden nodes 210A-D corresponding to one or more example hidden layers (represented collectively by the label 210), and example output nodes 215A-B corresponding to an example output layer (represented collectively by the label 215). Each of the nodes 205A-C, 210A-D and 215A-B performs one or more mathematical operations on its respective input data to produce corresponding output data. The mathematical operations can range from a simple equality operation to a more complex set of mathematical operations defined by a mathematical expression. The mathematical operations performed by a given node in the neural network are also referred to herein as a mathematical function implemented by the given node.

In the illustrated example neural network 200 of FIG. 2, the input nodes 205A-C of the input layer 205 accept a set of input data $\{x_1, x_2, x_3\}$ to be processed by the neural network 200. In the illustrated example, each of the input nodes 205A-C operates on a corresponding of the input data elements $\{x_1, x_2, x_3\}$ to produce a corresponding output. The outputs of the input nodes 205A-C are connected to the hidden nodes 210A-D of the hidden layer 210 such that each hidden node 210A-D performs a mathematical function on a weighted combination of outputs of the input nodes 205A-C to produce a corresponding output. For example, each hidden node 210A-D may apply different weights to the outputs of the input nodes 205A-C, and then perform a respective mathematical function on that weighted combination of outputs. In some examples, the respective mathematical functions implemented by the hidden nodes 210A-D are defined by a same mathematical expression for each of the hidden nodes 210A-D, but the model parameter(s) of the mathematical expression (including the weights applied to the outputs of the input nodes 205A-C) may be adjusted to have different value(s) for each of the hidden nodes 210A-D.

In a similar manner, the outputs of the hidden nodes 210A-D are connected to the output nodes 215A-B of the output layer 215 such that each output node 215A-B performs a mathematical function on a weighted combination of outputs of the hidden nodes 210A-D to produce a corresponding output. For example, each output node 215A-B may apply different weights to the outputs of the hidden nodes 210A-D, and then perform a respective mathematical function on that weighted combination of outputs. In some examples, the respective mathematical functions implemented by the output nodes 215A-B are defined by a same mathematical expression for each of the output nodes 215A-B, but the model parameter(s) of the mathematical expression (including the weights applied to the outputs of the hidden nodes 210A-D) may be adjusted to have different value(s) for each of the output nodes 215A-B. The resulting outputs produced by the output nodes 215A-B correspond to example outputs $\{y_{output1}, y_{output2}\}$ determined by the neural network 200.

An example mathematical function implemented by an example node of the example neural network 200 of FIG. 2 is illustrated in FIG. 3. The illustrated example of FIG. 3 corresponds to the mathematical function implemented by the example hidden node 210A of FIG. 2, but similar mathematical functions could be implemented by other nodes of the neural network 200. Referring to the example of FIG. 3, the input nodes 205A-C of the neural network 200 implement equality operations such that the outputs of the input nodes 205A-C are the inputs $\{x_1, x_2, x_3\}$ to the neural network 200. The outputs of the input nodes 205A-C are applied as input data to the hidden node 210A, which applies respective weights $\{w_1, w_2, w_3\}$ to the node's input data $\{x_1, x_2, x_3\}$. The hidden node 210A then applies an example summation operation 305 to the weighted inputs to compute a sum of the weighted inputs, which corresponds to Equation 1 below:

$$z = \sum_{i=1}^{n} w_i x_i \qquad \text{Equation 1}$$

The example summation operation 305 also adds an example bias term b such that the resulting output of the summation operation 305, which corresponds to Equation 2 below:

$$z = \sum_{i=1}^{n} w_i x_i + b \qquad \text{Equation 2}$$

In the illustrated example of FIG. 3, the hidden node 210A also applies an example activation function 310 to the output of the summation operation 305. The example activation function 310 could be any activation function. For example, the activation function 310 could be the stepwise activation function given by Equation 3 below:

$$\theta(z) = \begin{cases} 0 & \text{if } z < 0 \\ z & \text{if } 0 < z < 1 \\ 1 & \text{if } z > 1 \end{cases} \qquad \text{Equation 3}$$

Thus, the output y produced by the hidden node 210A is the output of the activation function 310, which corresponds to Equation 4 below:

$$y = \theta(z) \qquad \text{Equation 4}$$

In equation 4, z is given by the expression of Equation 2. As disclosed in further detail below, the example neural network distributor 105 decomposes the mathematical functions implemented by the nodes along a path from the input nodes 205A-C to the hidden nodes 210A-D and to a given one of the output nodes 215A-B of the neural network (e.g., such as the mathematical function implemented by the hidden node 210A as illustrated in the example of FIG. 3 and represented by Equation 4) to generate program code and data to include in blocks of a blockchain that is to store the neural network 200 for distribution to clients, such as the clients 110A-B.

A block diagram of an example implementation of the neural network distributor 105 of FIG. 1 is illustrated in FIG. 4. In the illustrated example of FIG. 4, the neural network distributor 105 is configured, adapted or otherwise structured to include an example network interface 405, an example neural network 410, an example neural network blockchain generator 415, an example neural network blockchain publisher 420, an example neural network training engine 425, an example blockchain updater 430, an example access authenticator 435 and example data storage 440. In the illustrated example of FIG. 4, the network interface 405 is implemented by any network interface device, card, chip, etc., capable of interfacing with the network 130 of FIG. 1.

In the illustrated example of FIG. 4, the neural network 410 corresponds to the neural network that is to be distributed by the neural network distributor 105 of FIG. 1. For example, the neural network 410 can correspond to the example neural network 200 of FIGS. 2-3. In some examples, the structure, such as size/arrangement of the neural network layers in terms of number of nodes, node interconnections, etc., of the nodes in the neural network 410, including the mathematical formulas performed the respective nodes of the neural network 410, is defined with computer programming code in one or more programming languages, such as, but not limited to, C, C++, Java, C#, Perl, Python, JavaScript, HyperText Markup Language (HTML), Structured Query Language (SQL), Swift, etc. For example, the programming code that specifies the structure of the neural network 410 may be auto-generated by one or more applications, generated by one or more human developers, etc. In some examples, the programming code that specifies the structure of the neural network 410 is stored in the data storage 440.

In the illustrated example of FIG. 4, the neural network blockchain generator 415 (also referred to herein as the blockchain generator 415) generates a blockchain to represent (e.g., store and distribute) the neural network 410. Accordingly, the neural network blockchain generator 415 is an example of means for generating blocks of a blockchain that is to store a neural network in accordance with teachings of this disclosure. As disclosed in further detail below, the blockchain generator 415, the blockchain blocks generated by the blockchain generator 415 correspond respectively to the output nodes of the neural network 410 (e.g., such as the output nodes 215A-B of the neural network 200). In some examples, the blockchain generator 415 generates programming code and data for a given block of the blockchain such that the generated programming code and data can be used (e.g., executed) to determine an output of the respective neural network output node (e.g., the respective output node 215A-B of the neural network 200) represented by that block of the blockchain. As such, the programming code and data generated by the blockchain generator 415 for a given block of the blockchain representing a given output node of the neural network 410 is based on the processing (e.g., mathematical operations) to be performed by the given output node, the hidden nodes and the input nodes on input data applied to the neural network 410 to determine an output of the given output node For example, assume that the neural network 410 corresponds to the neural network 200 of FIGS. 2-3. In such an example, to generate a given blockchain block representing the output node 215A of the neural network 200, the blockchain generator 415 decomposes the mathematical functions implemented by the nodes along a path from the input nodes 205A-C to the hidden nodes 210A-D and to the given output node 215A of the neural network 200 to generate the program code and data to include in that block of the blockchain. For example, the blockchain generator 415 may implement a compiler to decompose the mathematical functions implemented by the nodes along a path from the input nodes 205A-C to the hidden nodes 210A-D and to the given output node 215A to generate a data structure, such as a Merkle tree structure, to represent the mathematical functions performed along the path. The blockchain generator 415 may further generate the program code and data, which is to represent the resulting data structure, such as the Merkle tree structure, in one or more programming languages, such as, but not limited to, C, C++, Java, C#, Perl, Python, JavaScript, HTML, SQL, Swift, etc.

Figure 5:
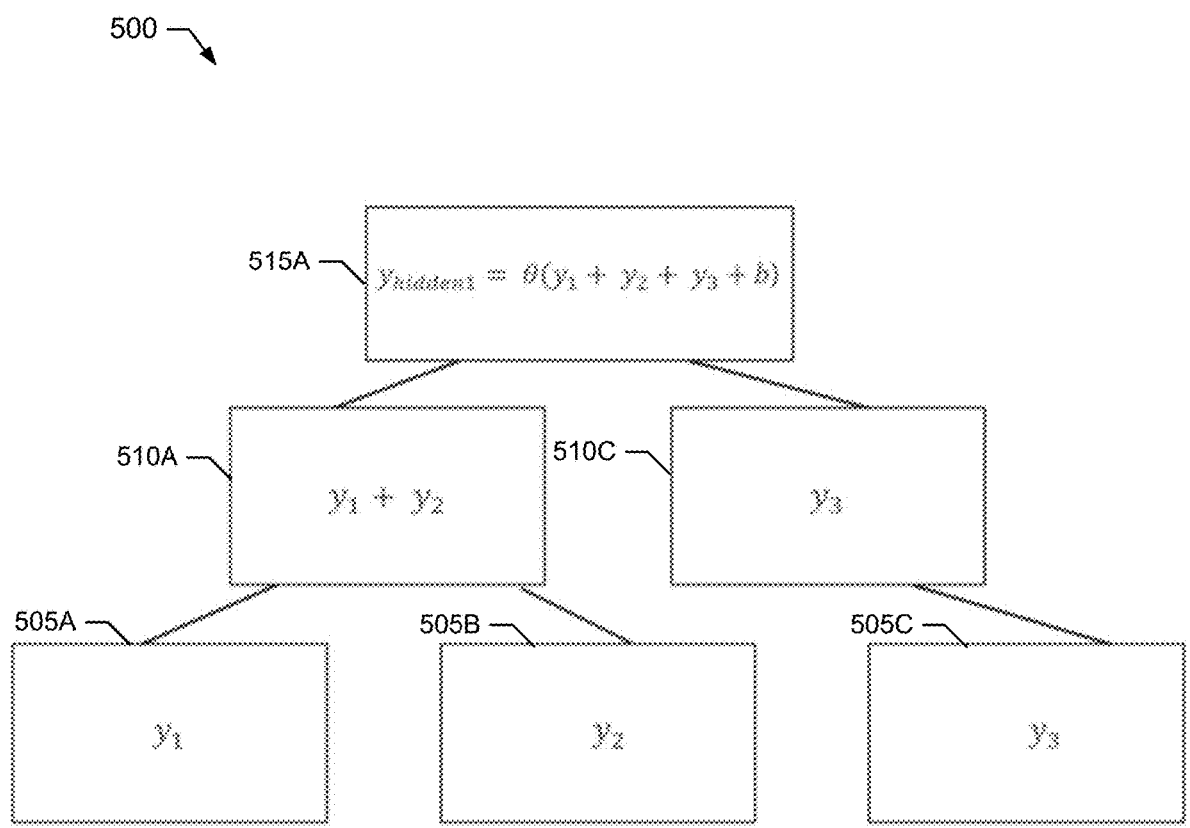
FIGS. 5-7 illustrate an example blockchain generated by the example neural network distributor of FIGS. 1 and/or 4 to store the example neural network of FIGS. 2-3.
Figure 6:
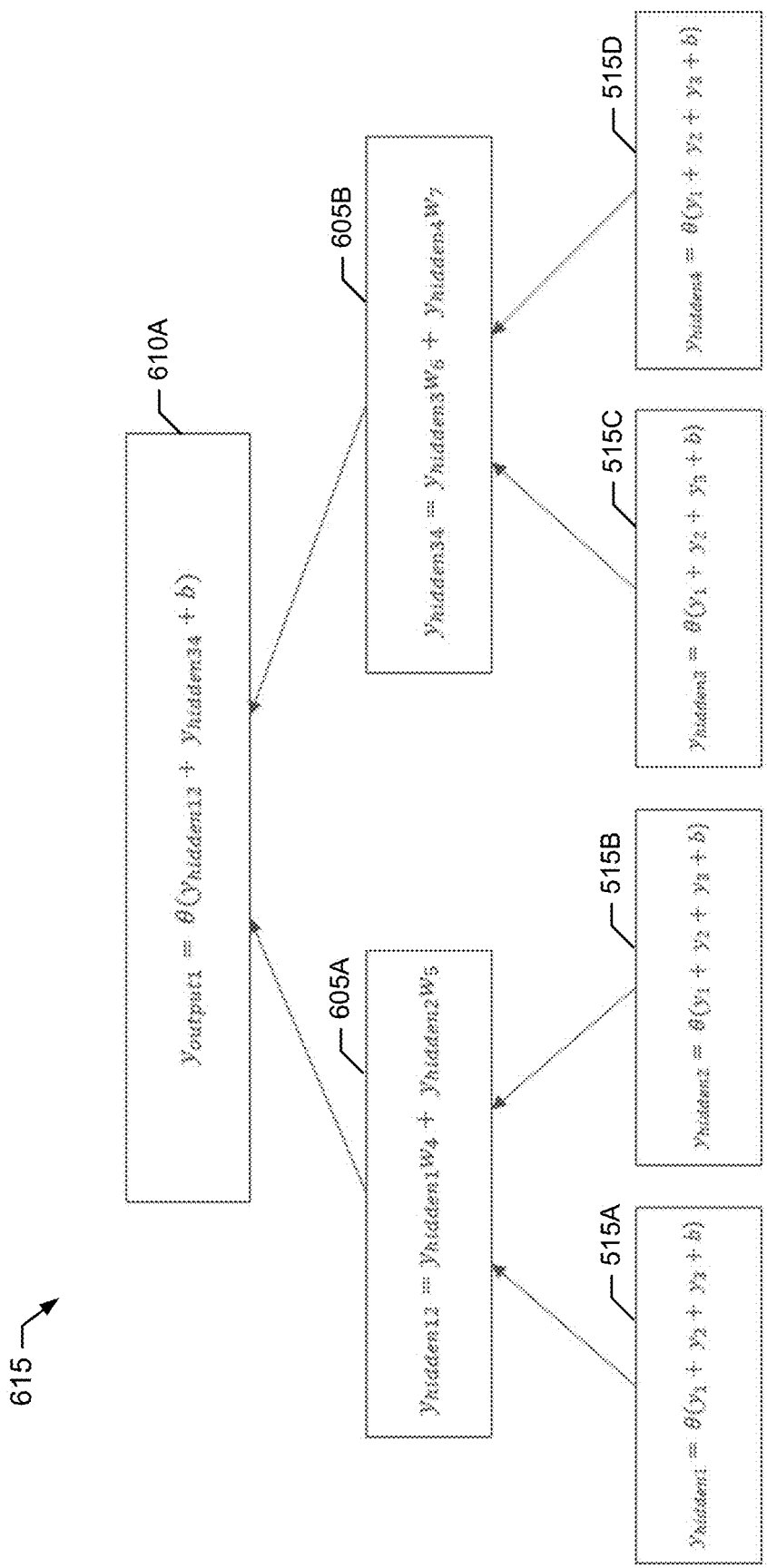
Figure 7:
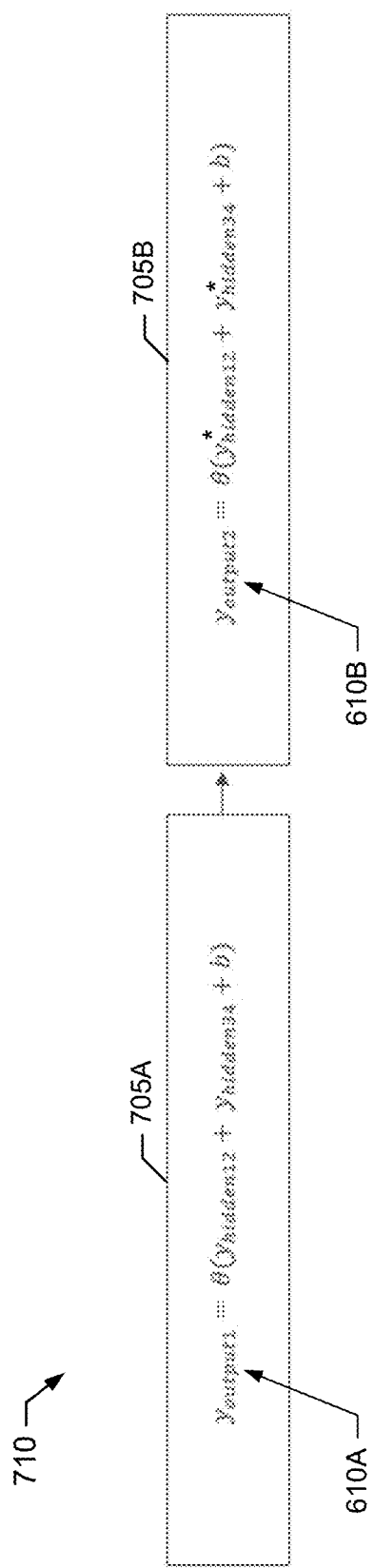

An example procedure performed by the blockchain generator 415 to generate a blockchain to represent the neural network 200 of FIG. 2 is illustrated in FIGS. 5-7. The example procedure of FIGS. 5-7 decomposes the structure of the neural network 200 into respective Merkle tree data structures for each of the output nodes 215A-B of the neural network 200, stores the respective Merkle tree data structures for the output nodes 215A-B in corresponding blockchain blocks, and links the blocks to form an example blockchain to represent the neural network 200.

The example procedure begins with the blockchain generator 415 determining Merkle tree data structures to represent the neural network processing (e.g., mathematical operations) along paths culminating in respective ones of the hidden nodes 210A-D. FIG. 5 illustrates an example Merkle tree data structure 500 generated by the blockchain generator 415 for the hidden node 210A of the neural network 200. With reference to FIGS. 2-3 and their corresponding written descriptions above, the blockchain generator 415 generates the Merkle tree data structure 500 to represent the neural network processing corresponding to Equation 4 above, that is, $y=\theta(z)$, where y is the output of the hidden node 210A, $\theta$ is the activation function given by Equation 3, $z=x_1w_1+x_2w_2+x_3w_3+b$ as given by Equation 2, $\{x_1, x_2, x_3\}$ are the inputs applied to the neural network 200, and $\{w_1, w_2, w_3\}$ are the weights applied by the hidden node 210A to those inputs.

To decompose the foregoing mathematical function implemented by the hidden node 210A into the Merkle tree data structure 500, the blockchain generator 415 begins by generating example first level elements 505A, 505B and 505C of the Merkle tree data structure 500 to correspond to the individual weighting operations performed on the input data $\{x_1, x_2, x_3\}$. For example, the blockchain generator 415 generates program code and data for element 505A to represent the mathematical relationship corresponding to the input $x_1$ being applied to the element 505A to produce the output $y_1=x_1w_1$. Likewise, the blockchain generator 415 generates program code and data for element 505B to represent the mathematical relationship corresponding to the input $x_2$ being applied to the element 505B to produce the output $y_2=x_2w_2$, and generates program code and data for element 505C to represent the mathematical relationship corresponding to the input $x_3$ being applied to the element 505C to produce the output $y_3=x_3w_3$.

The blockchain generator 415 then generates an example second level element 510A corresponding to a portion of the summation operation performed on the outputs of the elements 505A-B. For example, the blockchain generator 415 generates program code and data for element 510A to represent the mathematical relationship corresponding to the outputs $y_1$ and $y_2$ of elements 505A and 505B, respectively, being applied to element 510A to produce the output $y_1+y_2$. In the illustrated example, the blockchain generator 415 also generates a second level element 510C that duplicates the first level element 505C, but this could be omitted in other example procedures.

The blockchain generator 415 then generates an example third level element 515A corresponding to the remaining operations to be performed on the outputs of the second level elements 510A and C to yield the output of the hidden node 210A. (In examples in which the blockchain generator 415 does not generate the duplicate element 510C, the blockchain generator 415 generates the example third level element 515A to correspond to the remaining operations to be performed on the outputs of the second level element 510A and first level element 505C to yield the output of the hidden node 210A.) For example, the blockchain generator 415 generates program code and data for element 515A to represent the mathematical relationship corresponding to the output $y_1+y_2$ of element 510A and the output $y_3$ of element 510C being applied to element 515A to produce the output $y_{hidden1}=\theta(y_1+y_2+y_3+b)$, which corresponds to the output of Equation 4 described above. As such, the third level element 515A is also referred to as the root level element 515A for the Merkle tree structure corresponding to the hidden node 210A.

Turning to FIG. 6, the blockchain generator 415 repeats the foregoing procedure for hidden nodes 210B-D to generate respective Merkle tree data structures for these hidden nodes 210B-D having respective root level elements 515B-D. The blockchain generator 415 then continues to generate Merkle tree data structures for the respective output nodes 215A-B of the neural network 200. In the illustrated example, the output nodes 215A-B are assumed to implement similar mathematical functions as the hidden nodes 210A-D. For example, the output node 215A is assumed to implement the mathematical function given by Equation 5, which is:

$$y_{output}=\theta(w_4 y_{hidden1}+w_5 y_{hidden2}+w_6 y_{hidden3}+w_7 y_{hidden4}+b)$$ Equation 5 where $\theta$ is the activation function given by Equation 3, $y_{hidden\ i}$ is the output of the $i^{th}$ hidden node, the weights $w_4$ to $w_7$ are given by FIG. 2, and b is an offset. Beginning with the third level elements 515A-D, the blockchain generator 415 repeats the foregoing procedure described above in connection with FIG. 5 to decompose the mathematical function of Equation 5 into two example fourth-level elements 605A-B and an example fifth level element 610A of an Merkle tree data structure 615 shown in FIG. 6. The Merkle tree data structure 615 represents the mathematical functions implemented by the nodes along a path from the input nodes 205A-C to the hidden nodes 210A-D and to the output node 215A of the neural network 200. As such, the fifth level element 610A is also referred to as the root level element 610A for the Merkle tree data structure corresponding to the output node 215A of the neural network 200.

Turning to FIG. 7, the blockchain generator 415 repeats the foregoing procedure to generate a Merkle tree data structure for the output node 215B of the neural network 200. In the illustrated example, the Merkle tree data structure for the output node 215B has an example root level element 610B. (In FIG. 7, asterisks (*) are shown in element 610B to indicate that different weights may be used to combine the outputs of the hidden nodes at the output node 215B.) Then, the blockchain generator 415 stores the Merkle tree data structure (in the form of generated program code and data) for the output node 215A (represented by the root level element 610A in FIG. 7) in an example blockchain block 705A, and stores the Merkle tree data structure (in the form of generated program code and data) for the output node 215B (represented by the root level element 610B in FIG. 7) in an example blockchain block 705B. The blockchain generator 415 further links the example group of blocks 705A and B into an example blockchain 710 that is to represent the neural network 200. The blockchain generator 415 can use any blockchain mechanism to link the block 705B to the block 705A in the blockchain. Furthermore, in some examples, the blockchain generator 415 utilizes an ordering convention to link the blocks 705A-B of the blockchain 710 in a particular order such that the blocks 705A-B can be used to reconstruct the ordering of the output nodes of the neural network 200. Additionally or alternatively, in some examples, the blockchain generator 415 applies a version label or other version number identifier to the group of blockchain blocks (e.g., the block 705A-B) corresponding to a particular instance of the neural network 200 such that the blockchain blocks corresponding to a particular version of the neural network 200 can be readily accessed.

Returning to FIG. 4, the example neural network distributor 105 includes the neural network blockchain publisher 420 (also referred to herein as the blockchain publisher 420) to publish the blockchain generated by the blockchain generator 415 for the neural network 410 to the blockchain server(s) 115. Accordingly, the neural network blockchain publisher 420 is an example of means for forwarding (e.g., transmitting) a blockchain to a server that is to distribute a neural network to one or more clients in accordance with teachings of this disclosure. For example, the blockchain publisher 420 can transmit the blockchain (e.g., such as the blockchain 710) generated by the blockchain generator 415 for the neural network 410 (e.g., corresponding to the neural network 200) via the network interface 405 and communications network 130 to the blockchain server(s) 115.

The example neural network distributor 105 of FIG. 4 includes the neural network training engine 425 (also referred to herein as the training engine 425) to train the neural network 410 based on training data stored in the data storage 440. Accordingly, the neural network training engine 425 is an example of means for training a neural network based on training data in accordance with teachings of this disclosure. For example, the training engine 425 can implement any neural network training technique to iteratively train the model parameters of each node of the neural network (such as the weight and bias parameters described above) to achieve a desired level of performance (e.g., in terms of target thresholds of one or more of false positive detection rates, false negative detection rates, true positive detection rates and/or true negative detection rates).

In some examples, after each neural network training iteration performed by the training engine 425 (or some number of training iterations), the blockchain generator 415 generates a corresponding group of blockchain blocks representing the state of the neural network 410 after that training iteration. In some such examples, in addition to storing data in each of the blockchain blocks corresponding to the current values of the trained model parameters, after each training iteration (or some number of training iterations), the blockchain generator 415 also stores, for each element of the Merkle tree structure stored in a given blockchain block, the actual input data applied to that Merkle tree element and the corresponding output data produced by that Merkle tree element for that training iteration. For example, with reference to the Merkle tree elements shown in FIGS. 5-7, after a given training iteration, in addition to storing data in the blocks 705A and 705B corresponding to the current weight and bias values of the mathematical operations represented by each of the Merkle tree elements, the blockchain generator 415 may store, in each of the elements 505A-C, 510A&C, 515A-D, 605A-B and 610A-B, the actual input data applied to and the actual output data produced by each of those elements. In such examples, blockchain generator 415 appends the group of blocks generated after each training iteration to the blockchain (e.g., the blockchain 700) representing the neural network 410 to allow the evolution of the trained neural network to be securely stored for possible later analysis, integrity verification, etc. The blockchain generator 415 may identify each group of blockchain blocks corresponding to a given training iteration with a respective version label, number or other identifier. When training is complete, the last (e.g., most recent) group of blocks added to the blockchain by the blockchain generator 415 represents the trained neural network and may be identified with a version label or other version number information to indicate that group of blocks corresponds to a particular version of the neural network 410 to be distributed.

The example neural network distributor 105 of FIG. 4 includes the blockchain updater 430 to release updates to the neural network 410. For example, after the blockchain publisher 420 publishes a set of blocks generated by the blockchain generator 415 to represent the initial trained version of the neural network 410, the blockchain updater 430 can initiate retraining of the neural network 410 based on new/additional training data by invoking the training engine 425. When the retraining is complete, the blockchain updater 430 can apply a new version label or other version number identifier to the resulting new group of blocks generated by the blockchain generator 415 to enable the new version of the neural network 410 to be identified in the blockchain. The blockchain generator 415 can then invoke the blockchain publisher 420 to publish the group of blockchain blocks corresponding to this updated version of the neural network 410 to the blockchain server(s) 115. Accordingly, the blockchain updater 430 is an example of means for adding blocks to a blockchain to update the blockchain in accordance with teachings of this disclosure.

In some examples, the blockchain updater 430 may receive a new group of blocks to be added to blockchain to update neural network 410 from a client, such as the client 110A. For example, clients, such as the client 110, may include functionality to retrain the neural network 410 based on input data and corresponding outputs produced during operation of the neural network 410 at the client. In some such examples, the client, such as the client 110A, provides a new group of blockchain blocks corresponding to a neural network update to the blockchain updater 430, which verifies the integrity of the blocks before invoking the blockchain publisher 420 to publish the group of blockchain blocks (with an appropriate version label or other version number information) corresponding to this updated version of the neural network 410 to the blockchain server(s) 115.

The example neural network distributor 105 of FIG. 4 includes the example access authenticator 435 to implement proof-of-authority to restrict access to the blockchain storing the neural network 410. For example, the example access authenticator 435 may receive requests to access (e.g., update) the blockchain stored in the blockchain server(s) 115. For example, an access request may be received from the blockchain request handler 125 of the blockchain server 115 and correspond to a client, such as ones of the clients 110A-B, requesting to update the blockchain storing the neural network 410. The access authenticator 435 may implement any appropriate authentication procedure or combination thereof to verify that the requestor (e.g., client 110A-B) is authorized to update the blockchain. If the requestor is authorized to update the blockchain, the access authenticator 435 authorizes the request and transmits a reply to the blockchain server 115 to instruct the blockchain server 115 to grant the requestor access to update the blockchain (e.g., by adding a new group of blocks to the blockchain). However, if the requestor is not authorized to update the blockchain, the access authenticator 435 denies the request and transmits a reply to the blockchain server 115 to instruct the blockchain server 115 to block the requestor from updating the blockchain.

While an example manners of implementing the example neural network distributor 105, the example clients 110A-B and the example blockchain server(s) 115 are illustrated in FIGS. 1-4, one or more of the elements, processes and/or devices illustrated in FIG. 1-4 may be combined, divided, re-arranged, omitted, eliminated and/or implemented in any other way. Further, the example blockchain storage 120, the example blockchain request handler 125, the example neural network 200, the example network interface 405, the example neural network 410, the example neural network blockchain generator 415, the example neural network blockchain publisher 420, the example neural network training engine 425, the example blockchain updater 430, the example access authenticator 435, the example data storage 440 and/or, more generally, the example neural network distributor 105, the example clients 110A-B and/or the example blockchain server(s) 115 of FIGS. 1-4 may be implemented by hardware, software, firmware and/or any combination of hardware, software and/or firmware. Thus, for example, any of the example blockchain storage 120, the example blockchain request handler 125, the example neural network 200, the example network interface 405, the example neural network 410, the example neural network blockchain generator 415, the example neural network blockchain publisher 420, the example neural network training engine 425, the example blockchain updater 430, the example access authenticator 435, the example data storage 440 and/or, more generally, the example neural network distributor 105, the example clients 110A-B and/or the example blockchain server(s) 115 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example neural network distributor 105, the example clients 110A-B and/or the example blockchain server(s) 115, the example blockchain storage 120, the example blockchain request handler 125, the example neural network 200, the example network interface 405, the example neural network 410, the example neural network blockchain generator 415, the example neural network blockchain publisher 420, the example neural network training engine 425, the example blockchain updater 430, the example access authenticator 435 and/or the example data storage 440 is/are hereby expressly defined to include a non-transitory computer readable storage device or storage disk such as a memory, a digital versatile disk (DVD), a compact disk (CD), a Blu-ray disk, etc. including the software and/or firmware. Further still, the example neural network distributor 105, the example clients 110A-B and/or the example blockchain server(s) 115 of FIGS. 1-4 may include one or more elements, processes and/or devices in addition to, or instead of, those illustrated in FIGS. 1-4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
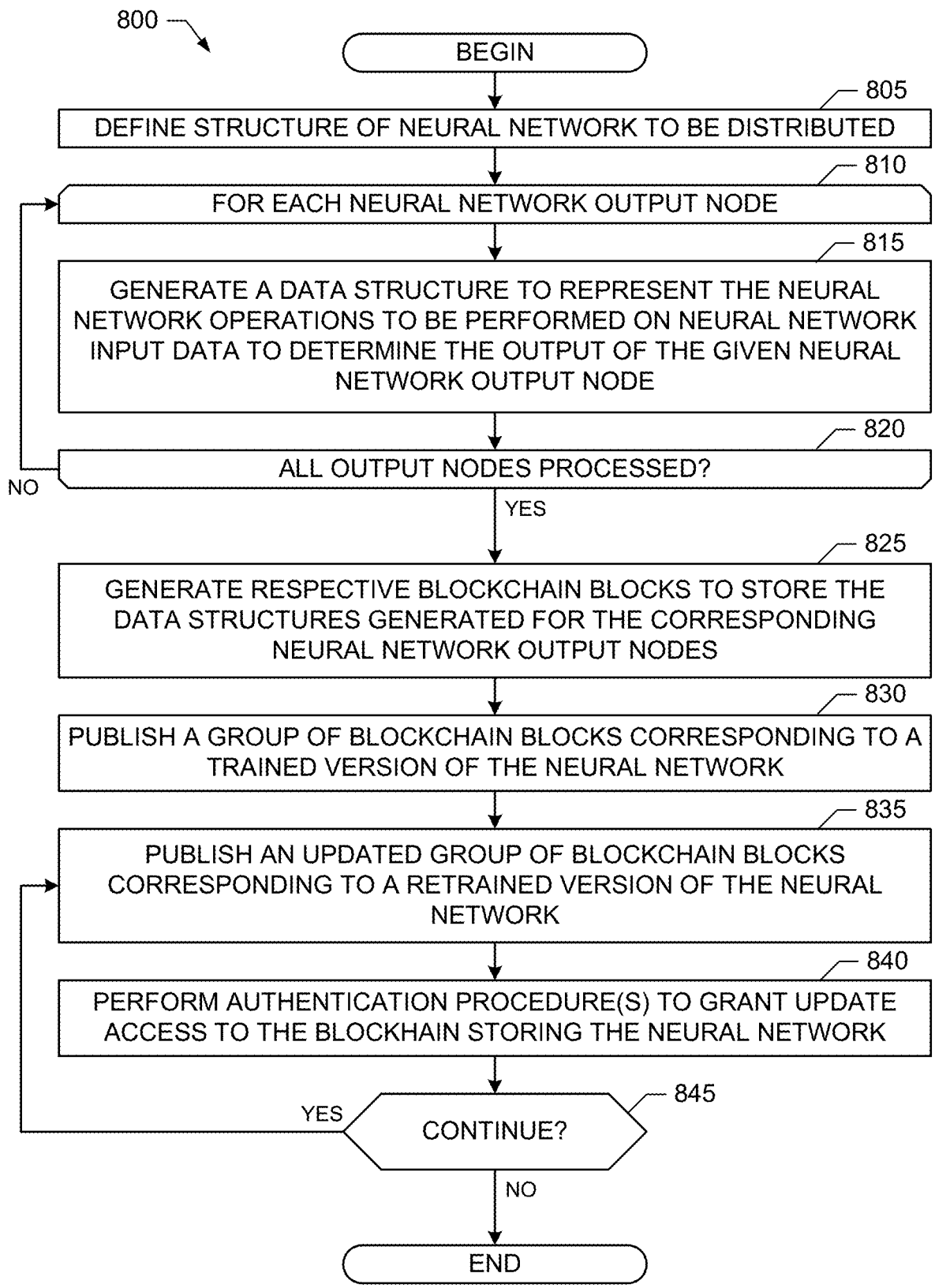
FIG. 8 is a flowchart representative of example computer readable instructions that may be executed to implement the example neural network distributor of FIGS. 1 and/or 4.
Figure 9:
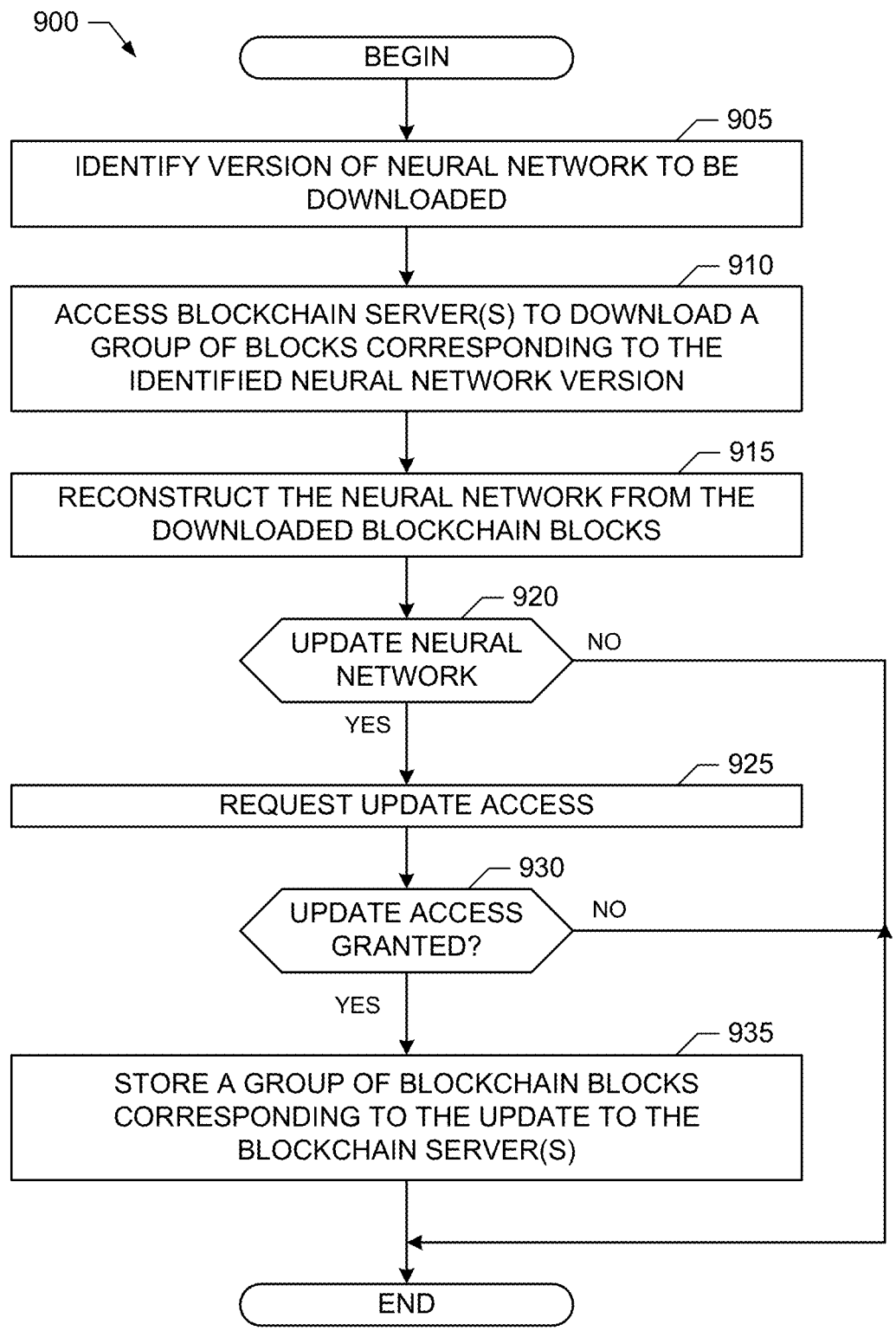
FIG. 9 is a flowchart representative of example computer readable instructions that may be executed to implement the example client of FIG. 1.
Figure 10:
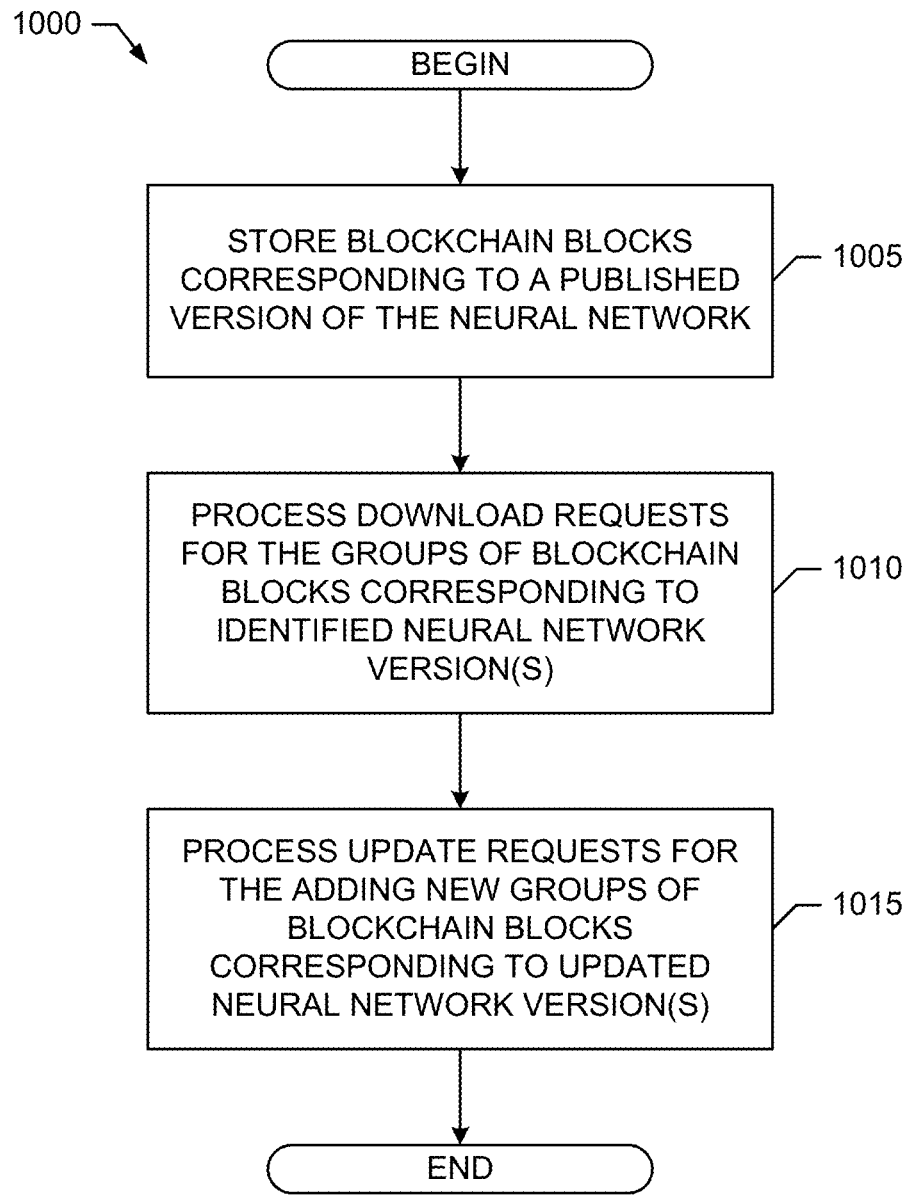
FIG. 10 is a flowchart representative of example computer readable instructions that may be executed to implement the example blockchain server(s) of FIG. 1.

Flowcharts representative of example hardware logic, machine readable instructions, hardware implemented state machines, and/or any combination thereof for implementing the example neural network distributor 105, the example clients 110A-B and the example blockchain server(s) 115 are shown in FIGS. 8-10, respectively. In these examples, the machine readable instructions may be one or more executable programs or portion(s) of an executable program for execution by a computer processor, such as the processor 1112, 1212 and/or 1312 shown in the example processor platforms 1100, 1200 and 1300 discussed below in connection with FIGS. 11-13. The one or more programs, or portion(s) thereof, may be embodied in software stored on a non-transitory computer readable storage medium such as a CD-ROM, a floppy disk, a hard drive, a DVD, a Blu-ray disk™, or a memory associated with the processors 1112, 1212 and/or 1312, but the entire program or programs and/or parts thereof could alternatively be executed by a device other than the processors 1112, 1212 and/or 1312, and/or embodied in firmware or dedicated hardware. Further, although the example program(s) is(are) described with reference to the flowcharts illustrated in FIGS. 8-10, many other methods of implementing the example neural network distributor 105, the example clients 110A-B and the example blockchain server(s) 115 may alternatively be used. For example, with reference to the flowcharts illustrated in FIGS. 8-10, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 8-10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

An example program 800 that may be executed to implement the example neural network distributor 105 of FIGS. 1 and/or 4 is represented by the flowchart shown in FIG. 8. With reference to the preceding figures and associated written descriptions, the example program 800 begins execution at block 805 at which the structure of the neural network 410 to be published is defined with computer programming code, as described above. At blocks 810 to 820, the blockchain generator 415 of the neural network distributor 105 generates, as described above, a respective data structure, such as a respective Merkle tree data structure, for each output node of the neural network 410. The respective data structure (e.g., Merkle tree data structure) for a given output node represents the respective functions to be performed by the given output node, the hidden nodes and the input nodes of the neural network along a path from the input nodes to the given output node to produce an output of that given output node.

At block 825, the blockchain generator 415 generates, as described above, respective blockchain blocks to store program code and data to implement the data structures (e.g., Merkle tree data structures) for the corresponding neural network output nodes. As such, the program code and data stored in a respective blockchain block corresponding to a given neural network output node can be used (e.g., executed) to implement the operations to be performed on neural network input data along a path from the input nodes to the hidden nodes and to the corresponding given neural network output node represented by the respective blockchain block. At block 830, the blockchain publisher 420 of the neural network distributor 105 publishes, as described above, a group of blockchain blocks generated by the blockchain generator 415 for the neural network 410 (e.g., after a training operation is completed by the training engine 425 of the neural network distributor 105) to the blockchain server(s) 115 to form a blockchain storing the neural network 410. As described above, the published blockchain blocks may include version information to identify the version of the neural network corresponding to the published blockchain blocks.

At block 835, the blockchain updater 430 of the neural network distributor 105 updates (e.g., retrains) the neural network 410 and invokes the blockchain generator 415 and blockchain publisher 420 to generate and publish a new group of blockchain blocks to add to the blockchain to store the updated version of the neural network 410, as described above. In some examples, the new group of blockchain blocks to add to the blockchain are received by the blockchain updater 430 from a client, such as the client 110A, requesting to update the neural network 410, as described above. At block 840, the access authenticator 435 performs one or more authentication procedures to grant access to authorized requesters (e.g., the client 110) to update the neural network blockchain stored in the blockchain server(s) 115, as described above. If operation is to continue (block 845), the control returns such that the processing at blocks 835 and 840 can be repeated.

An example program 900 that may be executed to implement one or both of the example clients 110A-B of FIG. 1 is represented by the flowchart shown in FIG. 9. For convenience and without loss of generality, the example program 900 is described from the perspective of execution by the example client 110A. With reference to the preceding figures and associated written descriptions, the example program 900 begins execution at block 905 at which the client 110A identifies a version of the published neural network to be downloaded from the blockchain server(s) 115. At block 910, the client 110A accesses the blockchain server(s) 115 to download the group of blockchain blocks corresponding to the identified neural network version. At block 915, the client 110A reconstructs the identified neural network version using the program code and data stored in each one of the downloaded group of blockchain blocks.

If the client 110A is configured to update the neural network (block 920), then at block 925 the client 110A sends a request to the blockchain server(s) 115 to update the blockchain. If the blockchain server(s) 115 grants update access to the client 110A (e.g., based on an authentication procedure performed by the neural network distributor 105) (block 930), the client 110A stores a new group of blocks corresponding to the neural network update to the blockchain server(s) 115. In some examples, the client 110A provides the new group of blocks corresponding to the neural network update to the neural network distributor 105, which perform integrity verification of the blockchain blocks for storing the new group of blocks to the blockchain server(s) 115.

An example program 1000 that may be executed to implement the example blockchain server 115 of FIG. 1 is represented by the flowchart shown in FIG. 10. With reference to the preceding figures and associated written descriptions, the example program 1000 begins execution at block 1005 at which the blockchain server 115 stores a group of blockchain blocks corresponding to a published neural network in the blockchain storage 120 of the blockchain server 115. At block 1010, the blockchain request handler 125 of the blockchain server 115 processes download requests from clients (e.g., the clients 110A-B) for groups of blockchain blocks corresponding to version(s) of the published neural network identified in the requests. At block 1015, the blockchain request handler 125 processes update requests from requestors (e.g., the clients 110A-B) requesting access to update the neural network. At block 1015, the blockchain request handler 125 grants update access to authorized requestor(s) (e.g., as determined by the neural network distributor 105), thereby allowing authorized requestor(s) to add groups of blocks to the blockchain that correspond to updated versions of the neural network.

Figure 11:
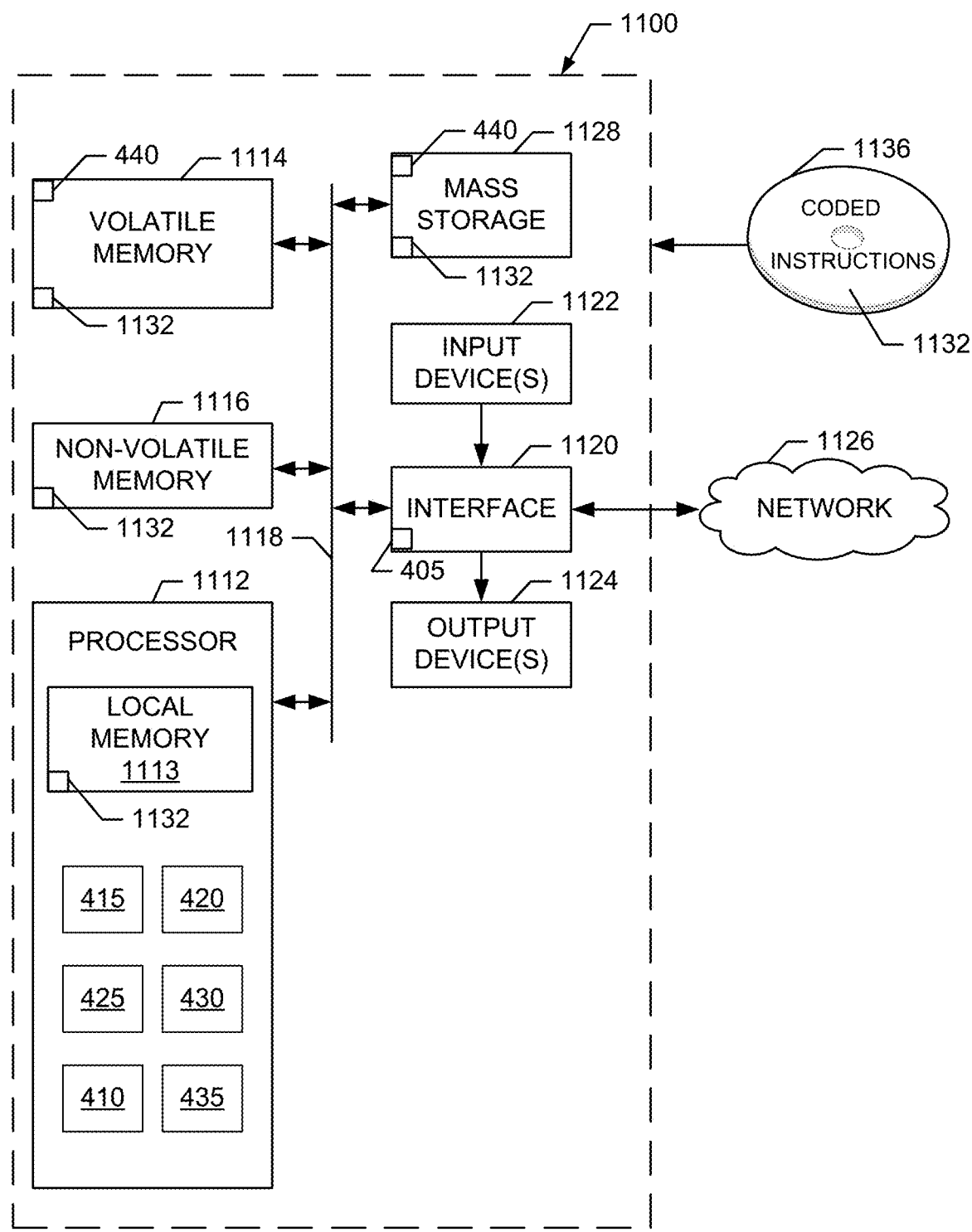
FIG. 11 is a block diagram of an example processor platform structured to execute the example computer readable instructions of FIG. 8 to implement the example neural network distributor of FIGS. 1 and/or 4.

FIG. 11 is a block diagram of an example processor platform 1100 structured to execute the instructions of FIG. 8 to implement the example neural network distributor 105 of FIG. 1. The processor platform 1100 can be, for example, a server, a personal computer, a workstation, a self-learning machine (e.g., a neural network), a mobile device (e.g., a cell phone, a smart phone, a tablet such as an iPad™), or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor 1112 may be a semiconductor based (e.g., silicon based) device. In this example, the processor 1112 implements the example neural network 410, the example neural network blockchain generator 415, the example neural network blockchain publisher 420, the example neural network training engine 425, the example blockchain updater 430, and the example access authenticator 435.

The processor 1112 of the illustrated example includes a local memory 1113 (e.g., a cache). The processor 1112 of the illustrated example is in communication with a main memory including a volatile memory 1114 and a non-volatile memory 1116 via a link 1118. The link 1118 may be implemented by a bus, one or more point-to-point connections, etc., or a combination thereof. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1100, can allow the user to control the computer system and provide data to the computer using physical gestures, such as, but not limited to, hand or body movements, facial expressions, and face recognition.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126, such as the network 130. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 1120 implements the example network interface 405.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives. In some examples, the mass storage device 1128 may implement the example data storage 440. Additionally or alternatively, in some examples the volatile memory 1114 may implement the example data storage 440.

The machine executable instructions 1132 corresponding to the instructions of FIG. 8 may be stored in the mass storage device 1128, in the volatile memory 1114, in the non-volatile memory 1116, in the local memory 1113 and/or on a removable non-transitory computer readable storage medium, such as a CD or DVD 1136.

Figure 12:
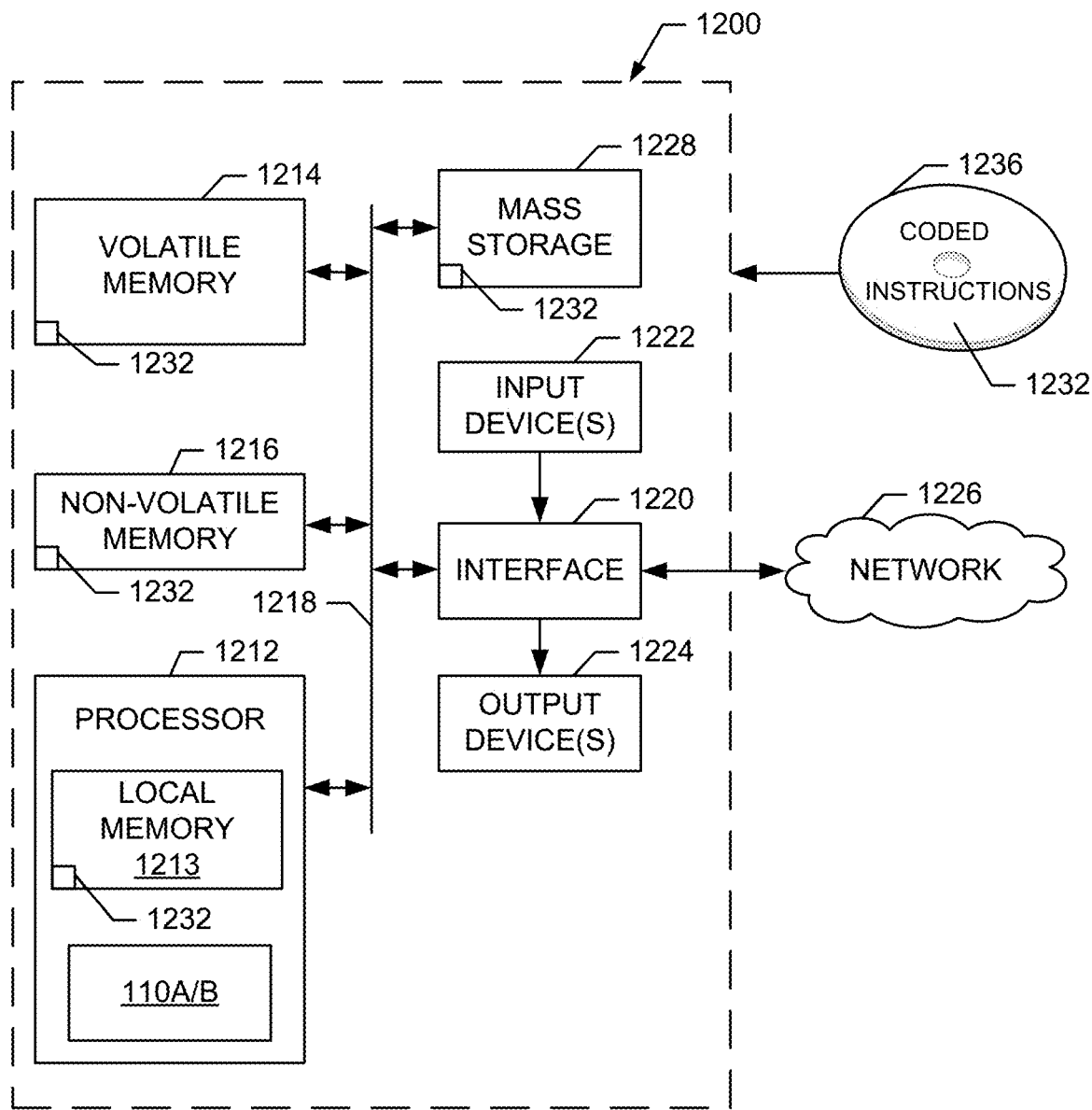
FIG. 12 is a block diagram of an example processor platform structured to execute the example computer readable instructions of FIG. 9 to implement the example client of FIG. 1

FIG. 12 is a block diagram of an example processor platform 1200 structured to execute the instructions of FIG. 9 to implement the example clients 110A-B of FIG. 1. The processor platform 1200 can be, for example, a server, a personal computer, a workstation, a self-learning machine (e.g., a neural network), a mobile device (e.g., a cell phone, a smart phone, a tablet such as an iPad™), a PDA, an Internet appliance, a DVD player, a CD player, a digital video recorder, a Blu-ray player, a gaming console, a personal video recorder, a set top box a digital camera, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor 1212 may be a semiconductor based (e.g., silicon based) device. In this example, the processor 1212 implements the example client 110A or 110B.

The processor 1212 of the illustrated example includes a local memory 1213 (e.g., a cache). The processor 1212 of the illustrated example is in communication with a main memory including a volatile memory 1214 and a non-volatile memory 1216 via a link 1218. The link 1218 may be implemented by a bus, one or more point-to-point connections, etc., or a combination thereof. The volatile memory 1214 may be implemented by SDRAM, DRAM, RDRAM® and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a USB, a Bluetooth® interface, an NFC interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1200, can allow the user to control the computer system and provide data to the computer using physical gestures, such as, but not limited to, hand or body movements, facial expressions, and face recognition.

One or more output devices 1224 are also connected to the interface circuit 1220 of the illustrated example. The output devices 1224 can be implemented, for example, by display devices (e.g., an LED, an OLED, an LCD, a CRT display, an IPS display, a touchscreen, etc.), a tactile output device, a printer and/or speakers(s). The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226, such as the network 130. The communication can be via, for example, an Ethernet connection, a DSL connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and DVD drives.

The machine executable instructions 1232 corresponding to the instructions of FIG. 9 may be stored in the mass storage device 1228, in the volatile memory 1214, in the non-volatile memory 1216, in the local memory 1213 and/or on a removable non-transitory computer readable storage medium, such as a CD or DVD 1236.

Figure 13:
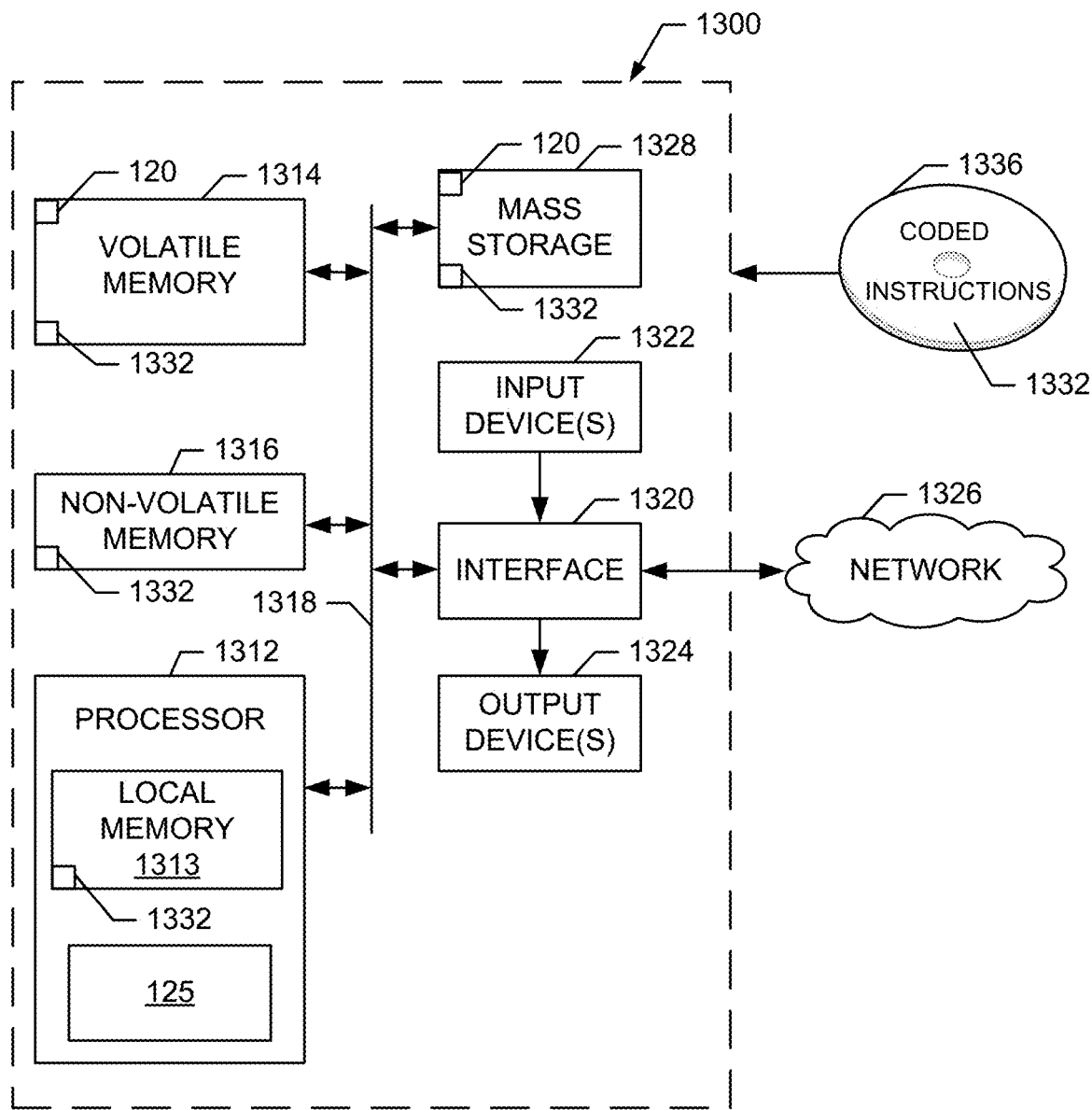
FIG. 13 is a block diagram of an example processor platform structured to execute the example computer readable instructions of FIG. 10 to implement the example blockchain server(s) of FIG. 1.

FIG. 13 is a block diagram of an example processor platform 1300 structured to execute the instructions of FIG. 10 to implement the example blockchain server(s) 115 of FIG. 1. The processor platform 1300 can be, for example, a server, a personal computer, a workstation, a self-learning machine (e.g., a neural network), a mobile device (e.g., a cell phone, a smart phone, a tablet such as an iPad™), or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor 1312 may be a semiconductor based (e.g., silicon based) device. In this example, the processor 1312 implements the example blockchain request handler 125.

The processor 1312 of the illustrated example includes a local memory 1313 (e.g., a cache). The processor 1312 of the illustrated example is in communication with a main memory including a volatile memory 1314 and a non-volatile memory 1316 via a link 1318. The link 1318 may be implemented by a bus, one or more point-to-point connections, etc., or a combination thereof. The volatile memory 1314 may be implemented by SDRAM, DRAM, RDRAM® and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a USB, a Bluetooth® interface, an NFC interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1300, can allow the user to control the computer system and provide data to the computer using physical gestures, such as, but not limited to, hand or body movements, facial expressions, and face recognition.

One or more output devices 1324 are also connected to the interface circuit 1320 of the illustrated example. The output devices 1324 can be implemented, for example, by display devices (e.g., an LED, an OLED, an LCD, a CRT display, an IPS display, a touchscreen, etc.), a tactile output device, a printer and/or speakers(s). The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326, such as the network 130. The communication can be via, for example, an Ethernet connection, a DSL connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and DVD drives. In some examples, the mass storage device 1228 may implement the example blockchain storage 120. Additionally or alternatively, in some examples the volatile memory 1214 may implement the example blockchain storage 120.

The machine executable instructions 1332 corresponding to the instructions of FIG. 10 may be stored in the mass storage device 1328, in the volatile memory 1314, in the non-volatile memory 1316, in the local memory 1313 and/or on a removable non-transitory computer readable storage medium, such as a CD or DVD 1336.

From the foregoing, it will be appreciated that example methods, apparatus and articles of manufacture have been disclosed that enable distribution of neural networks with blockchains. For example, disclosed blockchains can be used to store and distribute (e.g., download) neural networks to computer security clients, such as anti-virus detection clients, malware detection clients, firewall clients, etc., to enable detection of zero-day threats that may be undetectable by at least some prior threat detection solutions. The disclosed methods, apparatus and articles of manufacture improve the efficiency of using a computing device by providing a secure structure that can be used to store the mathematical functions implementing the nodes of the neural network, the evolution of the parameters of those functions as the neural network is trained before distribution and/or re-trained after distribution, a history of input data and corresponding output results during training and/or subsequent operation, etc. Through such a secure structure, the integrity of the neural network can be ensured, thereby ensuring the integrity of the computer security clients that utilize the neural network to perform threat detection. Furthermore, some disclosed authorities utilize a proof-of-authority blockchain to restrict the ability to update the blockchain to trusted entities (e.g., associated with authorized and authenticated accounts, clients, etc.). Such proof-of authority can prevent or at least mitigate malicious tampering of the neural network by an adversary, which also helps ensure the integrity of the computer security clients that utilize the neural network to perform threat detection. The disclosed methods, apparatus and articles of manufacture are accordingly directed to one or more improvement(s) in the functioning of a computer.

The foregoing disclosure provides example solutions to enable distribution of neural networks with blockchains. The following further examples, which include subject matter such as apparatus to distribute a neural network, non-transitory computer readable media including instructions that, when executed, cause at least one processor to distribute a neural network, and methods to distribute a neural network, are disclosed herein. The disclosed examples can be implemented individually and/or in one or more combinations.

Example 1 is an apparatus to distribute a neural network. The apparatus of example 1 includes a blockchain generator to generate blocks of a blockchain, the blockchain to store the neural network, the neural network including input nodes, hidden nodes and output nodes, respective ones of the blocks of the blockchain to include respective code and respective data to represent corresponding ones of the output nodes of the neural network, a first one of the blocks to include first code and first data to implement operations to be performed by a first one of the output nodes, the hidden nodes and the input nodes on input data applied to the neural network to determine an output of the first one of the output nodes. The apparatus of example 1 also includes a neural network training engine to train the neural network based on training data to determine at least portions of the respective data to include in the respective ones of the blocks of the blockchain. The apparatus of example 1 further includes a publisher to forward the blockchain to a server that is to distribute the neural network to one or more clients.

Example 2 includes the subject matter of example 1, wherein the first code is to define respective functions to be performed by the first one of the output nodes, the hidden nodes and the input nodes along a path from the input nodes to the first one of the output nodes in the neural network, and the first data is to include trained values of model parameters corresponding to the respective functions to be performed by the first one of the output nodes, the hidden nodes and the input nodes.

Example 3 includes the subject matter of example 2, wherein the blockchain generator is to generate the first code to represent the respective functions to be performed by the first one of the output nodes, the hidden nodes and the input nodes in a Merkle tree structure.

Example 4 includes the subject matter of any one of examples 1 to 3, wherein the blocks of the blockchain are a first group of blocks of the blockchain corresponding to a first training iteration performed by the neural network training engine, and the blockchain generator is to (i) generate an updated second group of blocks to add to the blockchain after a second training iteration performed by the neural network training engine to train the neural network; and (ii) add the second group of blocks to the blockchain.

Example 5 includes the subject matter of example 4, wherein the publisher is to transmit the blockchain to the server after the neural network training engine has trained the neural network, the blockchain to include respective groups of blocks corresponding to respective training iterations performed by the neural network training engine, the respective groups of blocks to include the first group of blocks corresponding to the first training iteration and the second group of blocks corresponding to the second training iteration.

Example 6 includes the subject matter of example 5, and further includes a blockchain updater to add a third group of blocks received from a first one of the clients to the blockchain, the third group of blocks corresponding to an update to the neural network to be made by the first one of the clients.

Example 7 includes the subject matter of example 5, wherein the publisher is to include respective version information in the respective groups of blocks included in the blockchain to identify versions of the neural network corresponding to the respective groups of blocks included in the blockchain.

Example 8 is a non-transitory computer readable medium including computer readable instructions which, when executed, cause at least one processor to at least: (i) generate blocks of a blockchain, the blockchain to store a neural network, the neural network including input nodes, hidden nodes and output nodes, respective ones of the blocks of the blockchain to include respective code and respective data to represent corresponding ones of the output nodes of the neural network, a first one of the blocks to include first code and first data to implement operations to be performed by a first one of the output nodes, the hidden nodes and the input nodes on input data applied to the neural network to determine an output of the first one of the output nodes; (ii) train the neural network based on training data to determine at least portions of the respective data to include in the respective ones of the blocks of the blockchain; and (iii) transmit the blockchain to a server that is to distribute the neural network to one or more clients.

Example 9 includes the subject matter of example 8, wherein the first code is to define respective functions to be performed by the first one of the output nodes, the hidden nodes and the input nodes along a path from the input nodes to the first one of the output nodes in the neural network, and the first data is to include trained values of model parameters corresponding to the respective functions to be performed by the first one of the output nodes, the hidden nodes and the input nodes.

Example 10 includes the subject matter of example 9, wherein the computer readable instructions, when executed, cause the at least one processor to generate the first code to represent the respective functions to be performed by the first one of the output nodes, the hidden nodes and the input nodes in a Merkle tree structure.

Example 11 includes the subject matter of any one of examples 8 to 10, wherein the blocks of the blockchain are a first group of blocks of the blockchain corresponding to a first neural network training iteration, and the computer readable instructions, when executed, cause the at least one processor to: (i) generate an updated second group of blocks to add to the blockchain after a second neural network training iteration; and (ii) add the second group of blocks to the blockchain.

Example 12 includes the subject matter of example 11, wherein the computer readable instructions, when executed, cause the at least one processor to transmit the blockchain to the server after the neural network has been trained, the blockchain to include respective groups of blocks corresponding to respective neural network training iterations, the respective groups of blocks to include the first group of blocks corresponding to the first training iteration and the second group of blocks corresponding to the second training iteration.

Example 13 includes the subject matter of example 12, wherein the computer readable instructions, when executed, further cause the at least one processor to add a third group of blocks received from a first one of the clients to the blockchain, the third group of blocks corresponding to an update to the neural network to be made by the first one of the clients.

Example 14 includes the subject matter of example 12, wherein the computer readable instructions, when executed, cause the at least one processor to include respective version information in the respective groups of blocks included in the blockchain to identify versions of the neural network corresponding to the respective groups of blocks included in the blockchain.

Example 15 is a method to distribute a neural network. The method of example 15 includes generating, by executing an instruction with at least one processor, blocks of a blockchain, the blockchain to store the neural network, the neural network including input nodes, hidden nodes and output nodes, respective ones of the blocks of the blockchain to include respective code and data to represent corresponding ones of the output nodes of the neural network, a first one of the blocks to include first code and first data to implement operations to be performed by a first one of the output nodes, the hidden nodes and the input nodes on input data applied to the neural network to determine an output of the first one of the output nodes. The method of example 15 also includes training, by executing an instruction with the least one processor, the neural network based on training data to determine at least portions of the respective data to include in the respective ones of the blocks of the blockchain. The method of example 15 further includes transmitting, by executing an instruction with the at least one processor, the blockchain to a server that is to distribute the neural network to one or more clients.

Example 16 includes the subject matter of example 15, wherein the first code is to define respective functions to be performed by the first one of the output nodes, the hidden nodes and the input nodes along a path from the input nodes to the first one of the output nodes in the neural network, and the first data is to include trained values of model parameters corresponding to the respective functions to be performed by the first one of the output nodes, the hidden nodes and the input nodes.

Example 17 includes the subject matter of example 16, and further includes generating the first code to represent the respective functions to be performed by the first one of the output nodes, the hidden nodes and the input nodes in a Merkle tree structure.

Example 18 includes the subject matter of any one of examples 15 to 17, wherein the blocks of the blockchain are a first group of blocks of the blockchain corresponding to a first neural network training iteration, and further includes (i) generating an updated second group of blocks to add to the blockchain after a second neural network training iteration, and (ii) adding the second group of blocks to the blockchain.

Example 19 includes the subject matter of example 18, wherein the transmitting of the blockchain to the server occurs after the neural network has been trained, the blockchain to include respective groups of blocks corresponding to respective neural network training iterations, the respective groups of blocks to include the first group of blocks corresponding to the first training iteration and the second group of blocks corresponding to the second training iteration.

Example 20 includes the subject matter of example 19, and further includes adding a third group of blocks received from a first one of the clients to the blockchain, the third group of blocks corresponding to an update to the neural network to be made by the first one of the clients.

Example 21 includes the subject matter of example 19, and further includes storing respective version information in the respective groups of blocks included in the blockchain to identify versions of the neural network corresponding to the respective groups of blocks included in the blockchain.

Example 22 is a client to download a neural network distributed by a blockchain. The client of example 22 include memory having computer readable instructions stored thereon. The client of example 22 also includes a process to execute the instructions to at least (i) identify a version of the neural network to be downloaded from a blockchain server, (ii) access the blockchain server to download a group of blocks of the blockchain, respective ones of the blocks of the blockchain to include respective code and respective data to represent corresponding ones of output nodes of the neural network, the neural network including input nodes, hidden nodes and the output nodes, the group of blocks corresponding to the identified version of the neural network, and (iii) reconstruct the neural network from the downloaded group of blocks of the blockchain.

Example 23 includes the subject matter of example 22, and further includes sending a request to the blockchain server to update the blockchain.

Example 24 includes the subject matter of example 23, wherein the group of blocks is a first group, and further includes storing a second group of blocks at the blockchain server in response to a grant of access by the blockchain server, the second group of blocks corresponding to the update to the blockchain.

Example 25 is blockchain server to distribute a neural network with a blockchain. The blockchain server of example 25 include memory having computer readable instructions stored thereon. The blockchain server of example 25 also includes a process to execute the instructions to at least (i) store blocks of the blockchain, respective ones of the blocks of the blockchain to include respective code and respective data to represent corresponding ones of output nodes of the neural network, the neural network including input nodes, hidden nodes and the output nodes, and (ii) process requests from clients to download groups of blocks of blockchain.

Example 26 includes the subject matter of example 25, wherein a first request from a first client includes a first version number, and to process the request, the processor is to download a first group of blocks of the blockchain to the first client, the first group of blocks corresponding to the first version number.

Example 27 includes the subject matter of example 26, wherein the processor is further to process update requests from the clients.

Example 28 includes the subject matter of example 27, wherein to process a first update request from the first client, the processor is to (i) determine whether the first client is authorized to update the blockchain, (ii) when the first client is authorized to update the blockchain, receive a second group of blocks from the first client, the second group of blocks corresponding to an update to the neural network, and add the second group of blocks to the blockchain.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to distribute a neural network model, the apparatus comprising:
    a blockchain generator to generate blocks of a blockchain, the blockchain to store the neural network model, the neural network model including input nodes, hidden nodes and output nodes, a first one of the blocks of the blockchain to include first code and first data to represent a first one of the output nodes of the neural network model, a second one of the blocks of the blockchain to include second code and second data to represent a second one of the output nodes of the neural network model, the first and second ones of the blocks to be linked in the blockchain in an order that permits reconstruction of an ordering of the first and second ones of the output nodes in the neural network model, the first code and the first data of the first one of the blocks of the blockchain to implement operations to be performed by a combination of the first one of the output nodes, the hidden nodes and the input nodes on input data applied to the neural network model to determine an output of the first one of the output nodes;
    a neural network training engine to train the neural network model based on training data to determine at least portions of the first and second data to include in the first and second ones of the blocks of the blockchain; and
    a publisher to forward the blockchain to a server that is to distribute the neural network model to one or more clients.

2. The apparatus of claim 1, wherein the first code is to define respective functions to be performed by the combination of the first one of the output nodes, the hidden nodes and the input nodes along a path from the input nodes to the first one of the output nodes in the neural network model, and the first data is to include trained values of model parameters corresponding to the respective functions to be performed by the combination of the first one of the output nodes, the hidden nodes and the input nodes.

3. The apparatus of claim 2, wherein the blockchain generator is to generate the first code to represent the respective functions to be performed by the combination of the first one of the output nodes, the hidden nodes and the input nodes in a Merkle tree structure.

4. The apparatus of claim 1, wherein the blocks of the blockchain are a first group of blocks of the blockchain corresponding to a first training iteration performed by the neural network training engine, and the blockchain generator is to:
    generate an updated second group of blocks to add to the blockchain after a second training iteration performed by the neural network training engine to train the neural network model; and
    add the second group of blocks to the blockchain.

5. The apparatus of claim 4, wherein the publisher is to transmit the blockchain to the server after the neural network training engine has trained the neural network model, the blockchain to include respective groups of blocks corresponding to respective training iterations performed by the neural network training engine, the respective groups of blocks to include the first group of blocks corresponding to the first training iteration and the second group of blocks corresponding to the second training iteration.

6. The apparatus of claim 5, further including a blockchain updater to add a third group of blocks received from a first one of the clients to the blockchain, the third group of blocks corresponding to an update to the neural network model to be made by the first one of the clients.

7. The apparatus of claim 5, wherein the publisher is to include respective version information in the respective groups of blocks included in the blockchain to identify versions of the neural network model corresponding to the respective groups of blocks included in the blockchain.

8. A non-transitory computer readable medium comprising computer readable instructions which, when executed, cause at least one processor to at least:
    generate blocks of a blockchain, the blockchain to store a neural network model, the neural network model including input nodes, hidden nodes and output nodes, a first one of the blocks of the blockchain to include first code and first data to represent a first one of the output nodes of the neural network model, a second one of the blocks of the blockchain to include second code and second data to represent a second one of the output nodes of the neural network model, the first and second ones of the blocks to be linked in the blockchain in an order that permits reconstruction of an ordering of the first and second ones of the output nodes in the neural network model, the first code and the first data of the first one of the blocks of the blockchain to implement operations to be performed by a combination of the first one of the output nodes, the hidden nodes and the input nodes on input data applied to the neural network model to determine an output of the first one of the output nodes;
    train the neural network model based on training data to determine at least portions of the first and second data to include in the first and second ones of the blocks of the blockchain; and
    transmit the blockchain to a server that is to distribute the neural network model to one or more clients.

9. The non-transitory computer readable medium of claim 8, wherein the first code is to define respective functions to be performed by the combination of the first one of the output nodes, the hidden nodes and the input nodes along a path from the input nodes to the first one of the output nodes in the neural network model, and the first data is to include trained values of model parameters corresponding to the respective functions to be performed by the combination of the first one of the output nodes, the hidden nodes and the input nodes.

10. The non-transitory computer readable medium of claim 9, wherein the computer readable instructions, when executed, cause the at least one processor to generate the first code to represent the respective functions to be performed by the combination of the first one of the output nodes, the hidden nodes and the input nodes in a Merkle tree structure.

11. The non-transitory computer readable medium of claim 8, wherein the blocks of the blockchain are a first group of blocks of the blockchain corresponding to a first neural network training iteration, and the computer readable instructions, when executed, cause the at least one processor to:
generate an updated second group of blocks to add to the blockchain after a second neural network training iteration; and
add the second group of blocks to the blockchain.

12. The non-transitory computer readable medium of claim 11, wherein the computer readable instructions, when executed, cause the at least one processor to transmit the blockchain to the server after the neural network model has been trained, the blockchain to include respective groups of blocks corresponding to respective neural network training iterations, the respective groups of blocks to include the first group of blocks corresponding to the first training iteration and the second group of blocks corresponding to the second training iteration.

13. The non-transitory computer readable medium of claim 12, wherein the computer readable instructions, when executed, further cause the at least one processor to add a third group of blocks received from a first one of the clients to the blockchain, the third group of blocks corresponding to an update to the neural network model to be made by the first one of the clients.

14. The non-transitory computer readable medium of claim 12, wherein the computer readable instructions, when executed, cause the at least one processor to include respective version information in the respective groups of blocks included in the blockchain to identify versions of the neural network model corresponding to the respective groups of blocks included in the blockchain.

15. A method to distribute a neural network model, the method comprising:
generating, by executing an instruction with at least one processor, blocks of a blockchain, the blockchain to store the neural network model, the neural network model including input nodes, hidden nodes and output nodes, a first one of the blocks of the blockchain to include first code and first data to represent a first one of the output nodes of the neural network model, a second one of the blocks of the blockchain to include second code and second data to represent a second one of the output nodes of the neural network model, the first and second ones of the blocks to be linked in the blockchain in an order that permits reconstruction of an ordering of the first and second ones of the output nodes in the neural network model, the first code and the first data of the first one of the blocks of the blockchain to implement operations to be performed by a combination of the first one of the output nodes, the hidden nodes and the input nodes on input data applied to the neural network model to determine an output of the first one of the output nodes;
training, by executing an instruction with the least one processor, the neural network model based on training data to determine at least portions of the first and second data to include in the first and second ones of the blocks of the blockchain; and
transmitting, by executing an instruction with the at least one processor, the blockchain to a server that is to distribute the neural network model to one or more clients.

16. The method of claim 15, wherein the first code is to define respective functions to be performed by the combination of the first one of the output nodes, the hidden nodes and the input nodes along a path from the input nodes to the first one of the output nodes in the neural network model, and the first data is to include trained values of model parameters corresponding to the respective functions to be performed by the combination of the first one of the output nodes, the hidden nodes and the input nodes.

17. The method of claim 15, wherein the blocks of the blockchain are a first group of blocks of the blockchain corresponding to a first neural network training iteration, and further including:
generating an updated second group of blocks to add to the blockchain after a second neural network training iteration; and
adding the second group of blocks to the blockchain.

18. The method of claim 17, wherein the transmitting of the blockchain to the server occurs after the neural network model has been trained, the blockchain to include respective groups of blocks corresponding to respective neural network training iterations, the respective groups of blocks to include the first group of blocks corresponding to the first training iteration and the second group of blocks corresponding to the second training iteration.

19. The method of claim 18, further including adding a third group of blocks received from a first one of the clients to the blockchain, the third group of blocks corresponding to an update to the neural network model to be made by the first one of the clients.

20. The method of claim 18, further including storing respective version information in the respective groups of blocks included in the blockchain to identify versions of the neural network model corresponding to the respective groups of blocks included in the blockchain.

* * * * *